March 30, 1937.   J. F. MITCHELL   2,075,296
BOTTLE CAPPING MACHINE
Filed Aug. 6, 1931   12 Sheets-Sheet 5
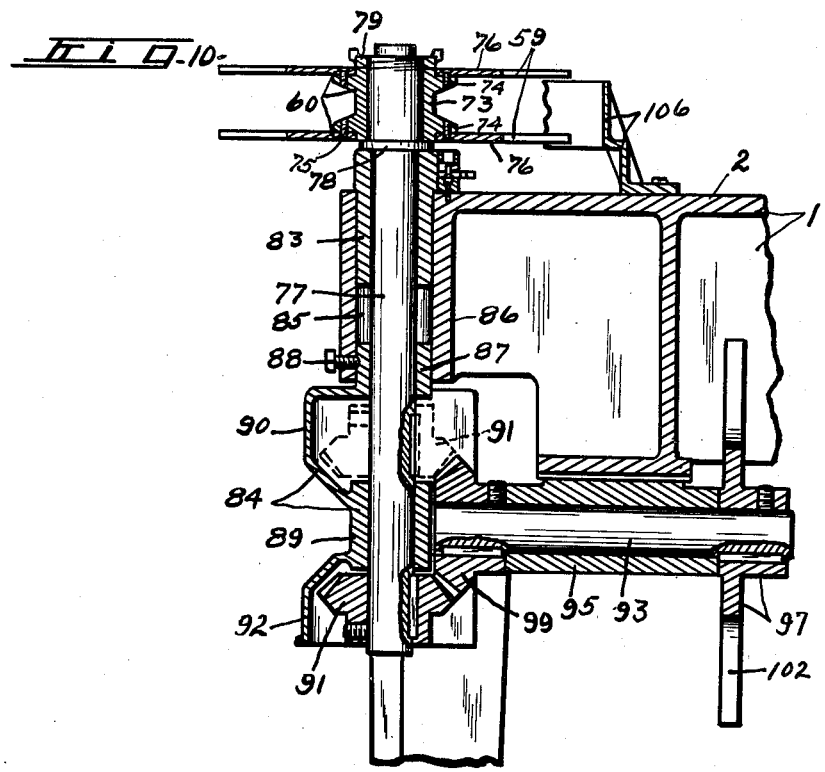
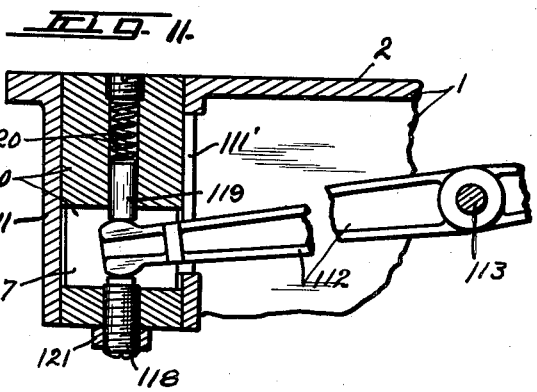
WITNESS
J. J. Mains
INVENTOR
J. F. Mitchell
BY
Denison & Thompson
ATTORNEYS

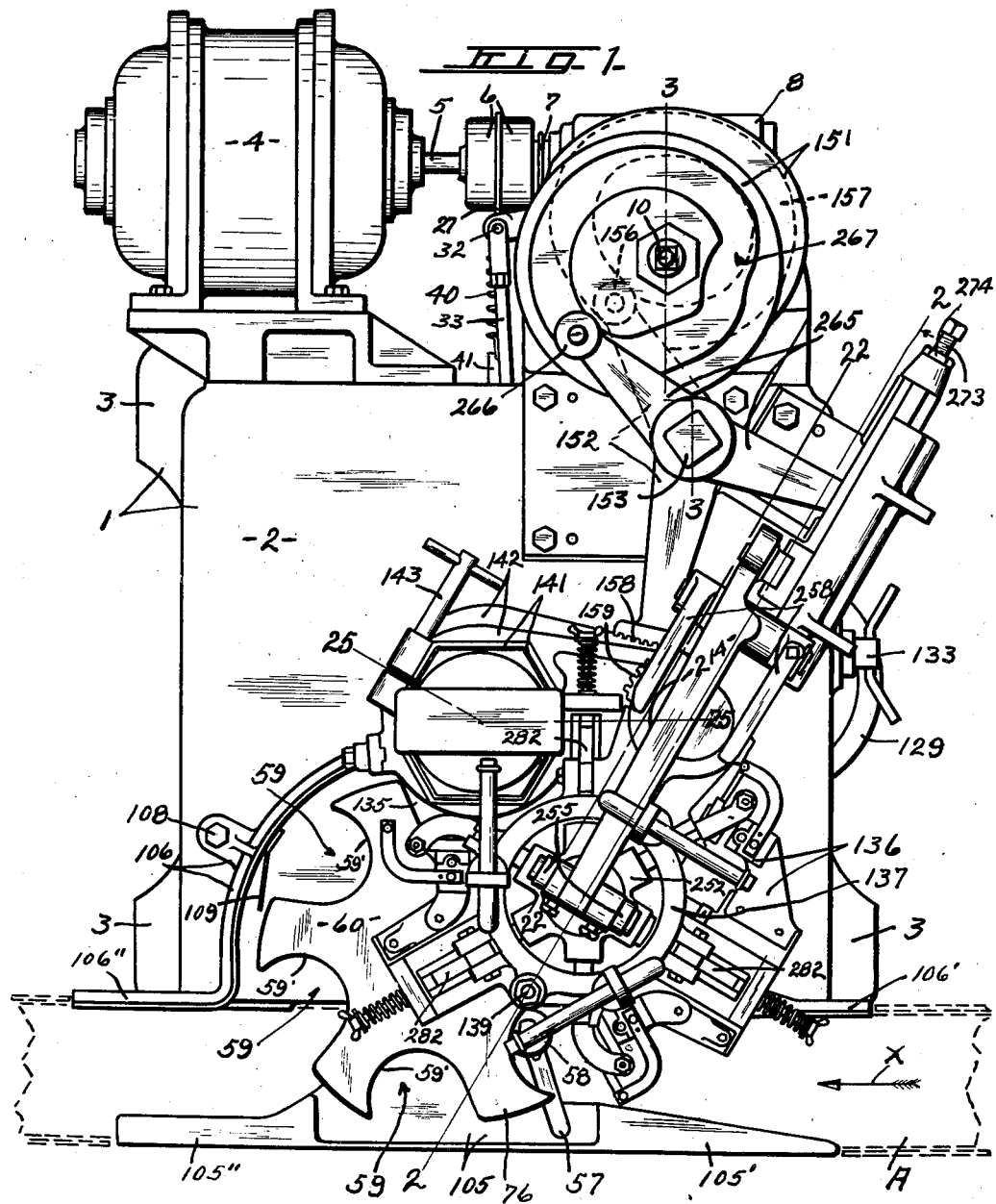

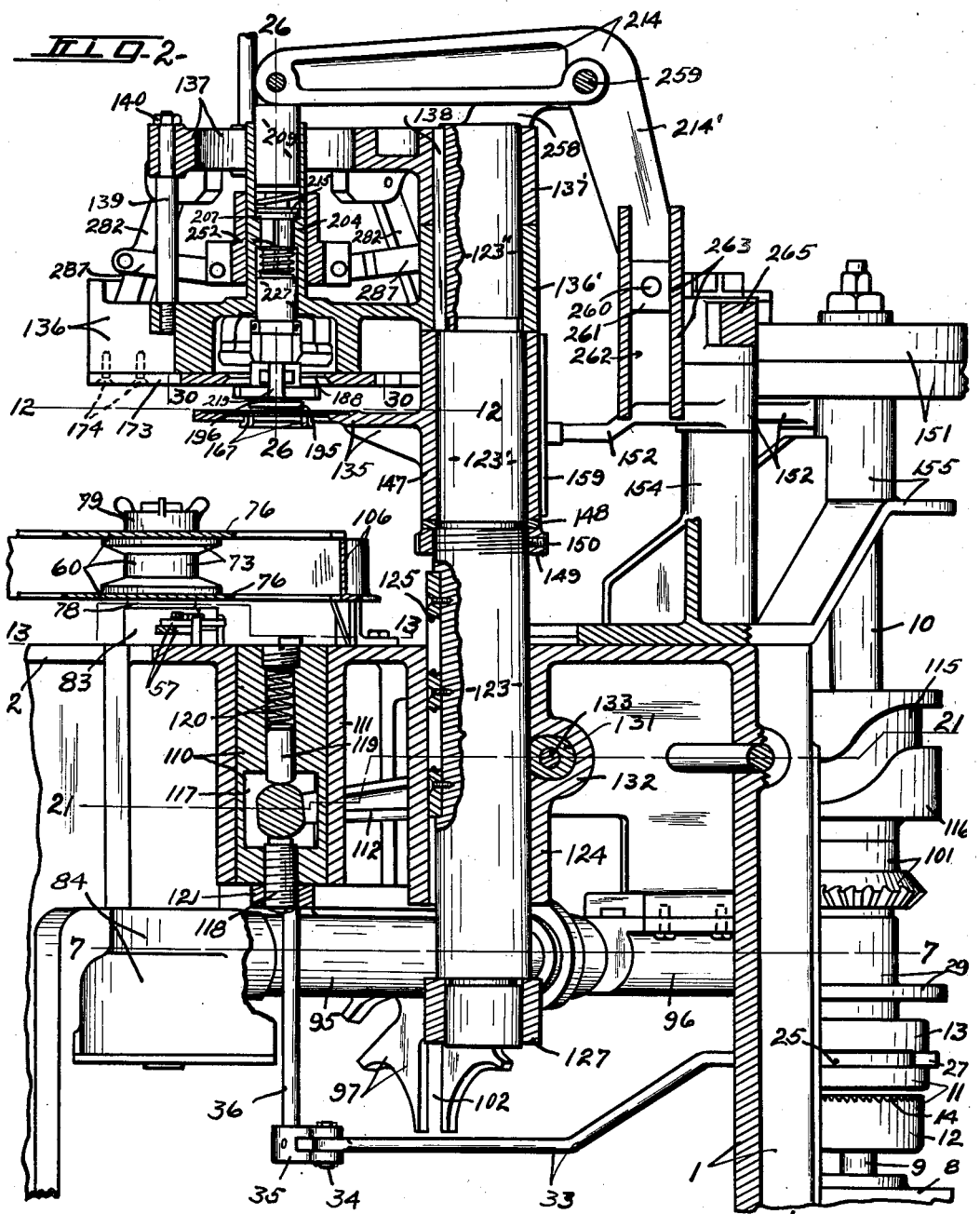

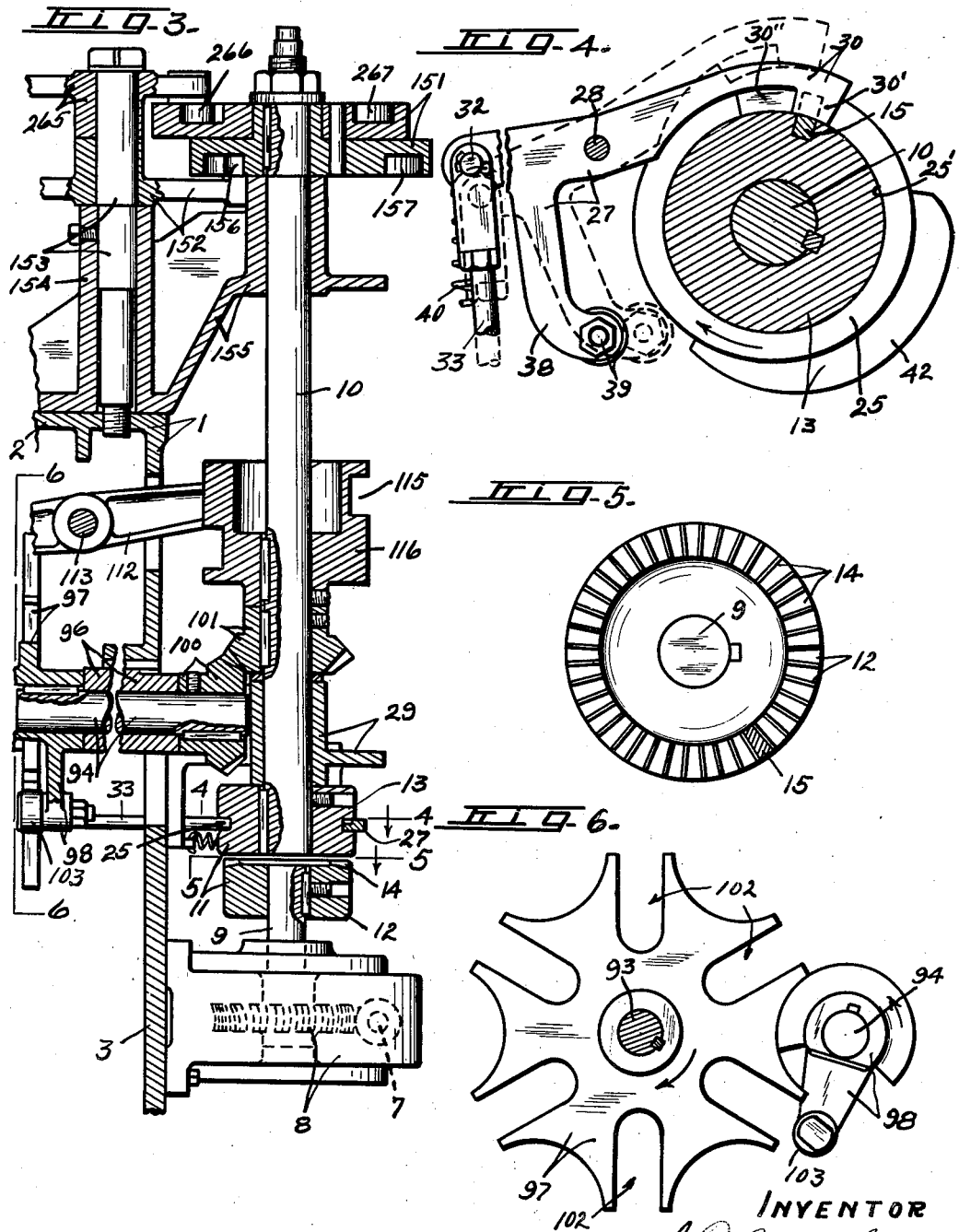

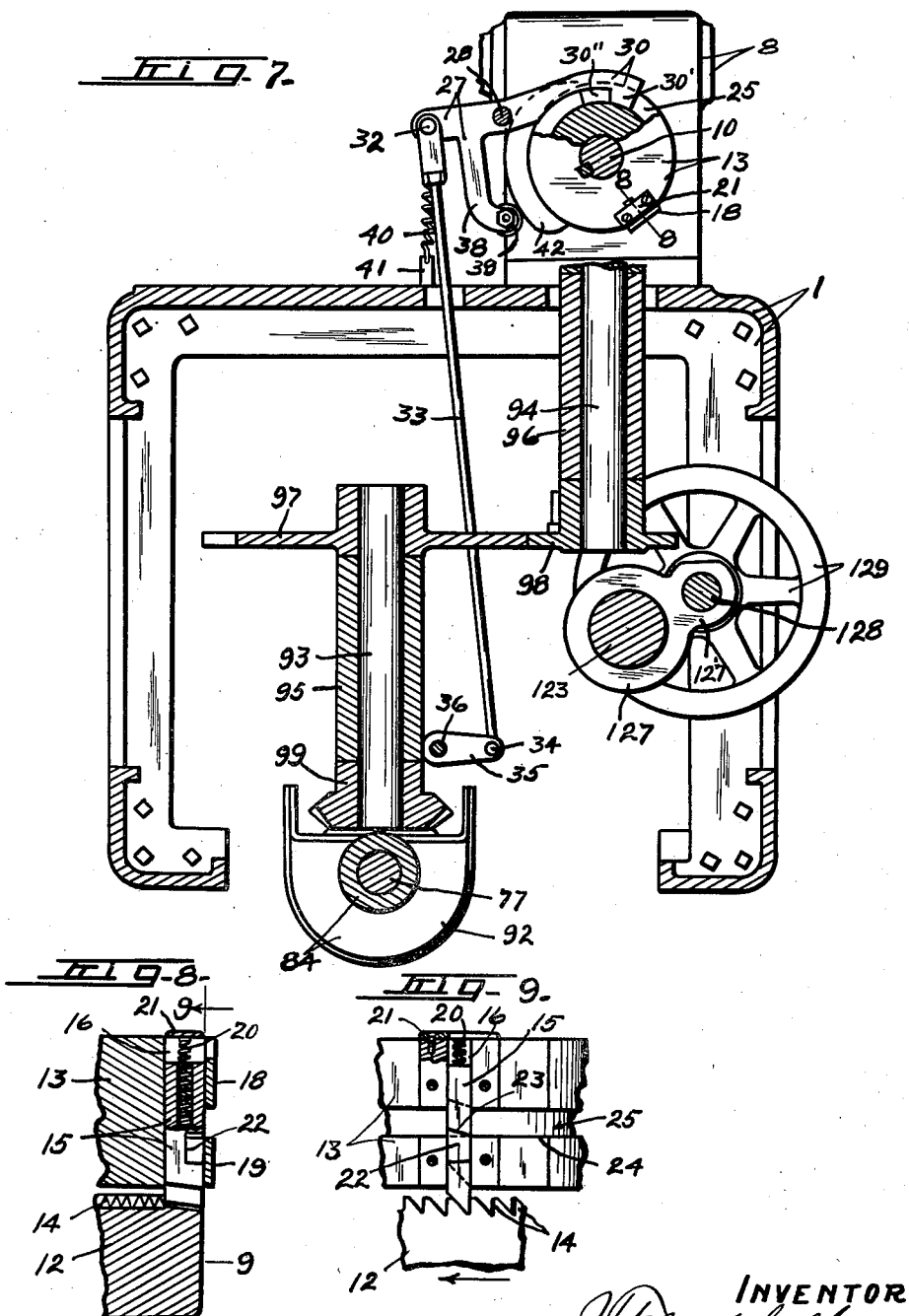

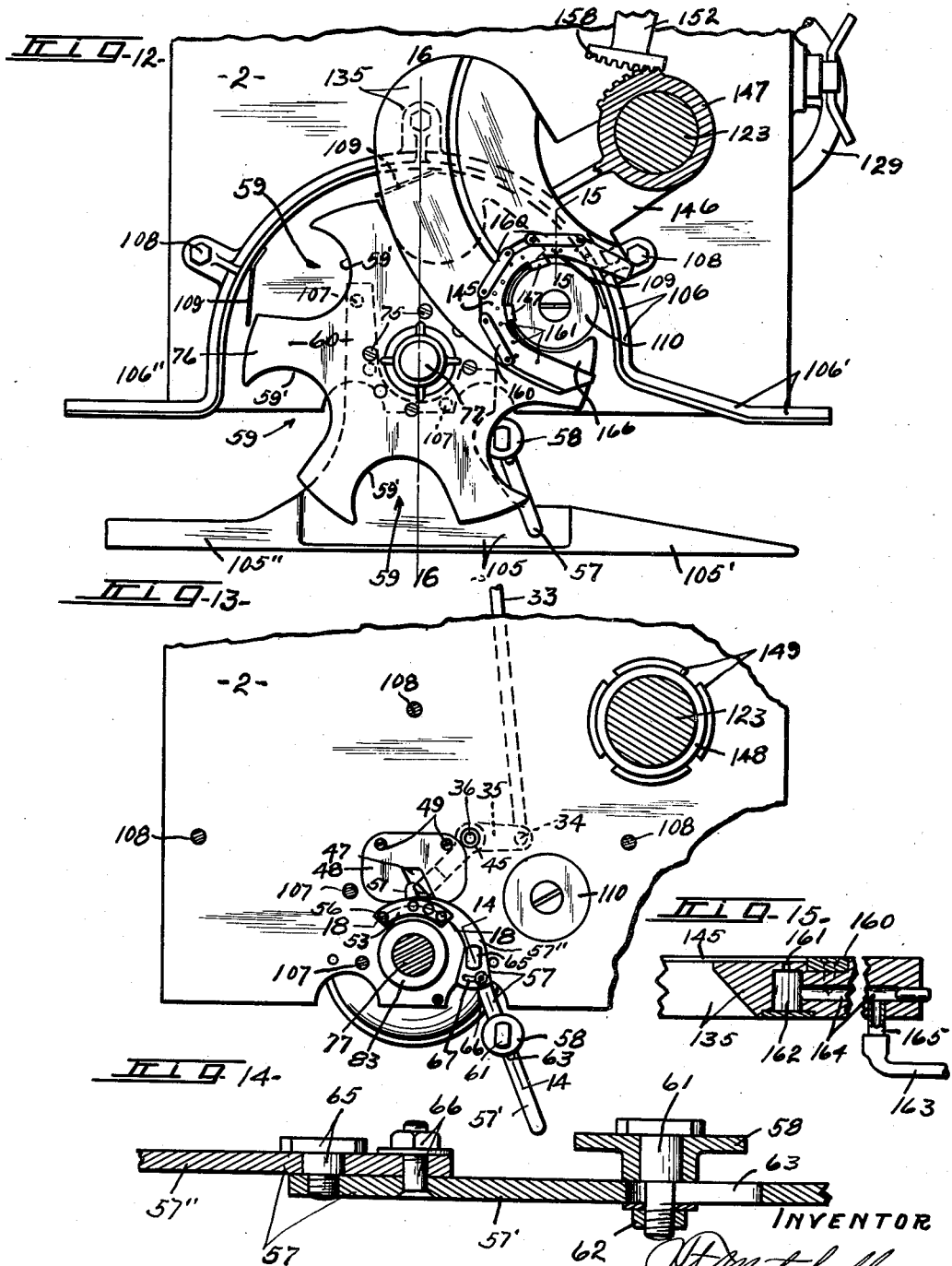

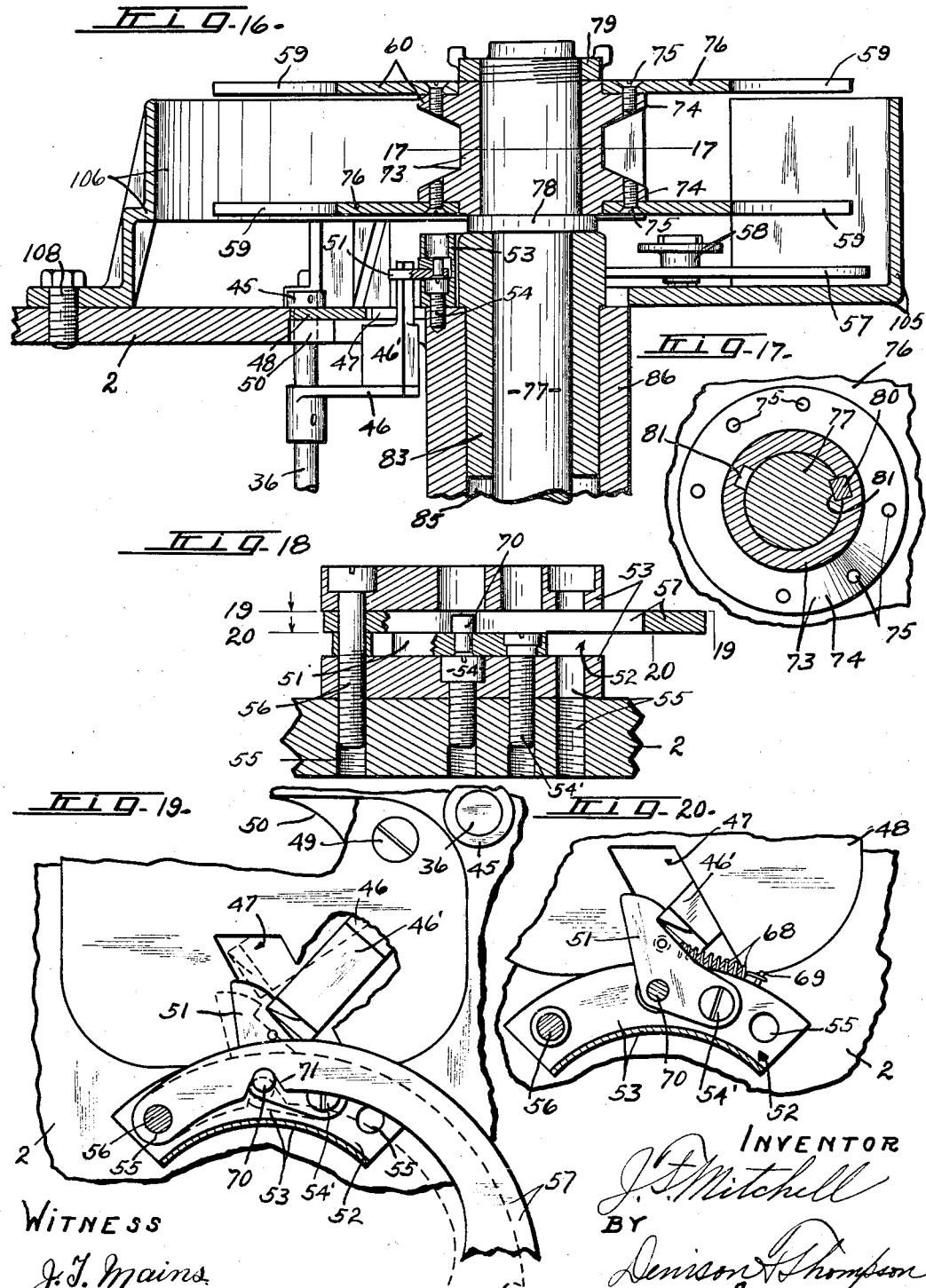

March 30, 1937. J. F. MITCHELL 2,075,296
BOTTLE CAPPING MACHINE
Filed Aug. 6, 1931 12 Sheets-Sheet 8
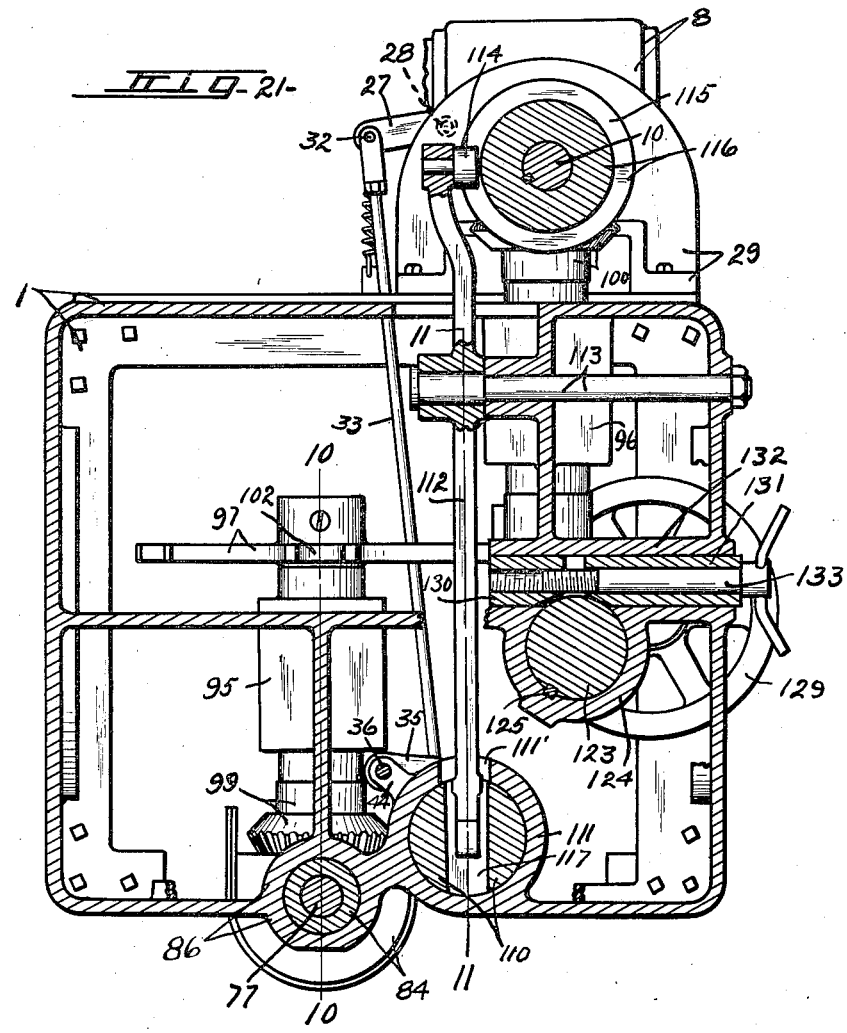
WITNESS
J. J. Mains
INVENTOR
J. F. Mitchell
BY
Denison & Thompson
ATTORNEYS March 30, 1937.  J. F. MITCHELL  2,075,296
BOTTLE CAPPING MACHINE
Filed Aug. 6, 1931   12 Sheets-Sheet 9
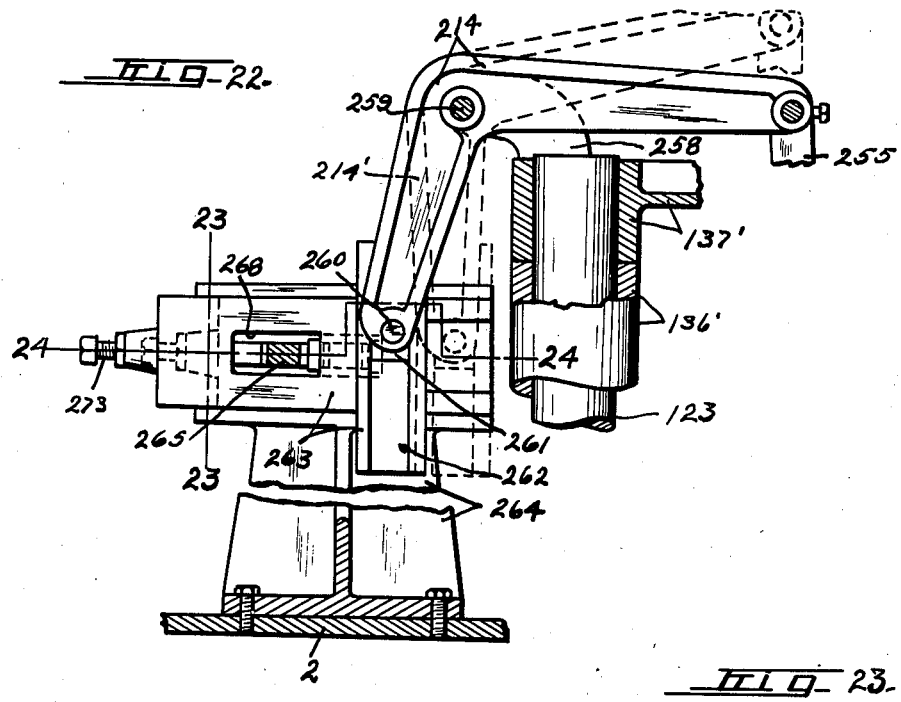
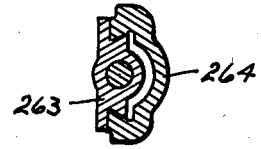
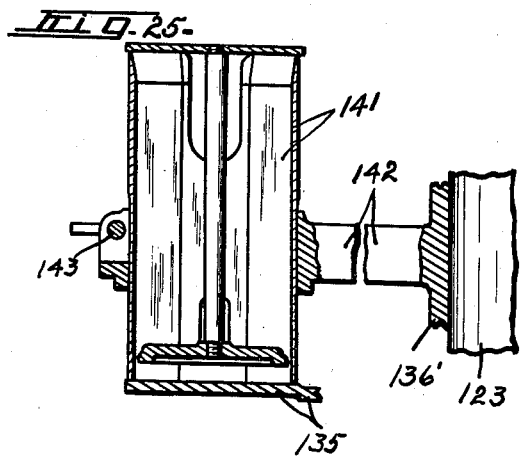
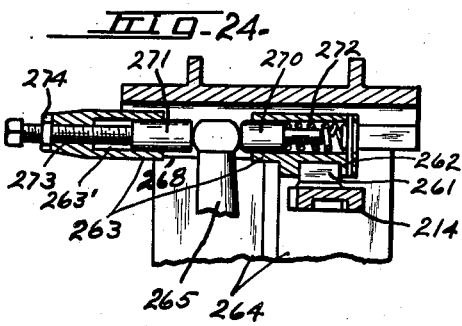
WITNESS
J.J. Mains.
INVENTOR
J.F. Mitchell
BY
Denison & Thompson
ATTORNEYS

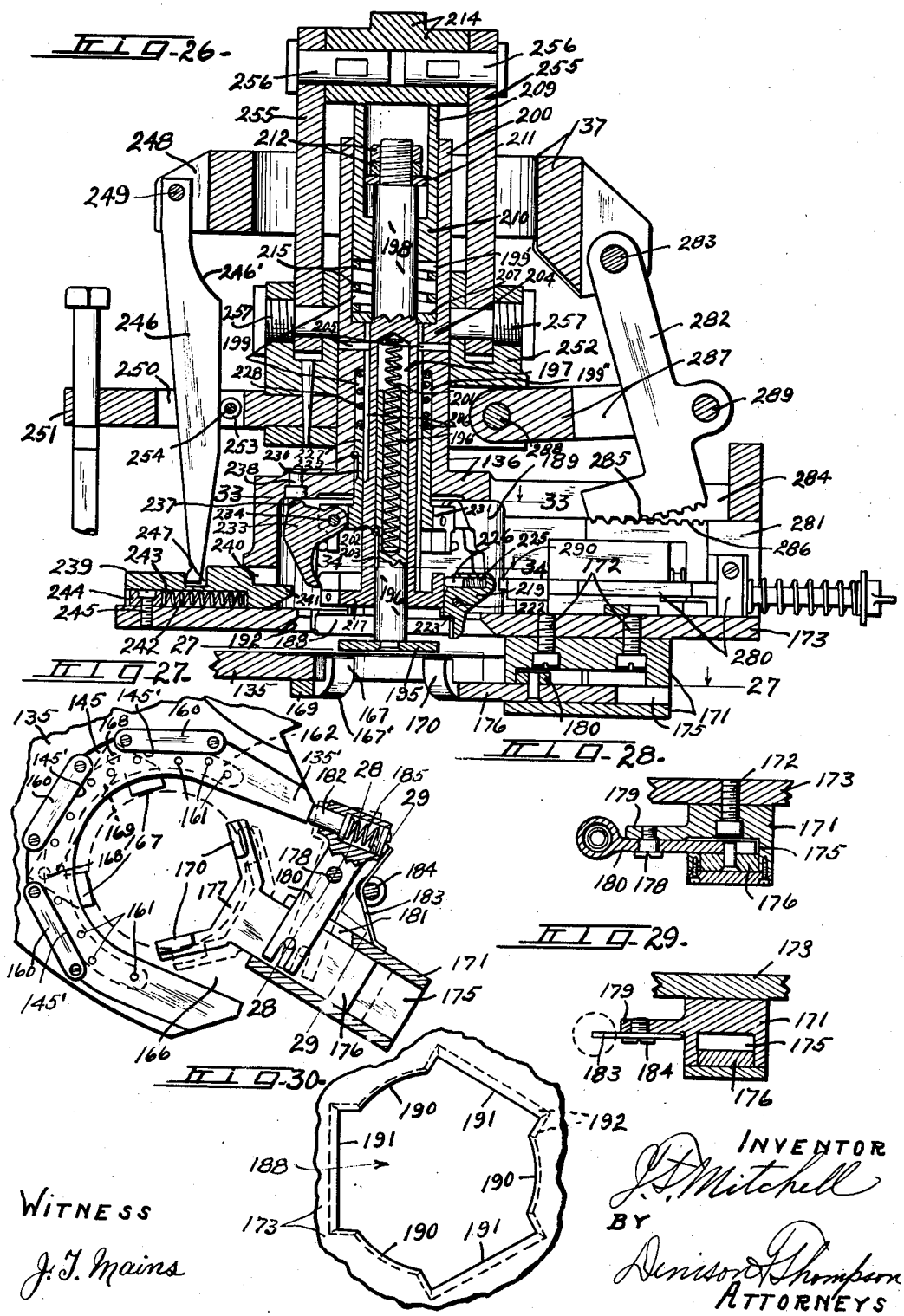

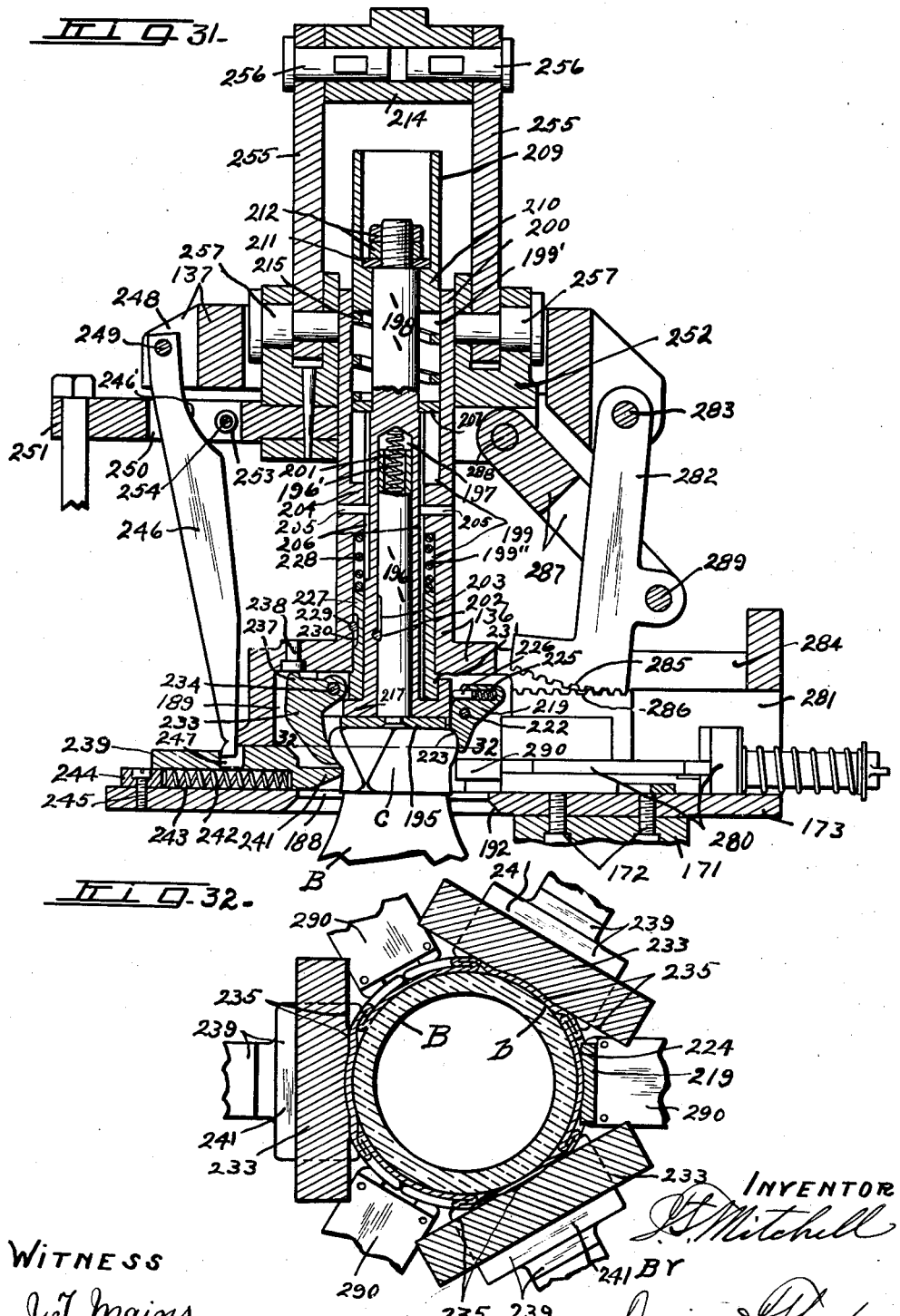

March 30, 1937.   J. F. MITCHELL   2,075,296
BOTTLE CAPPING MACHINE
Filed Aug. 6, 1931   12 Sheets-Sheet 12
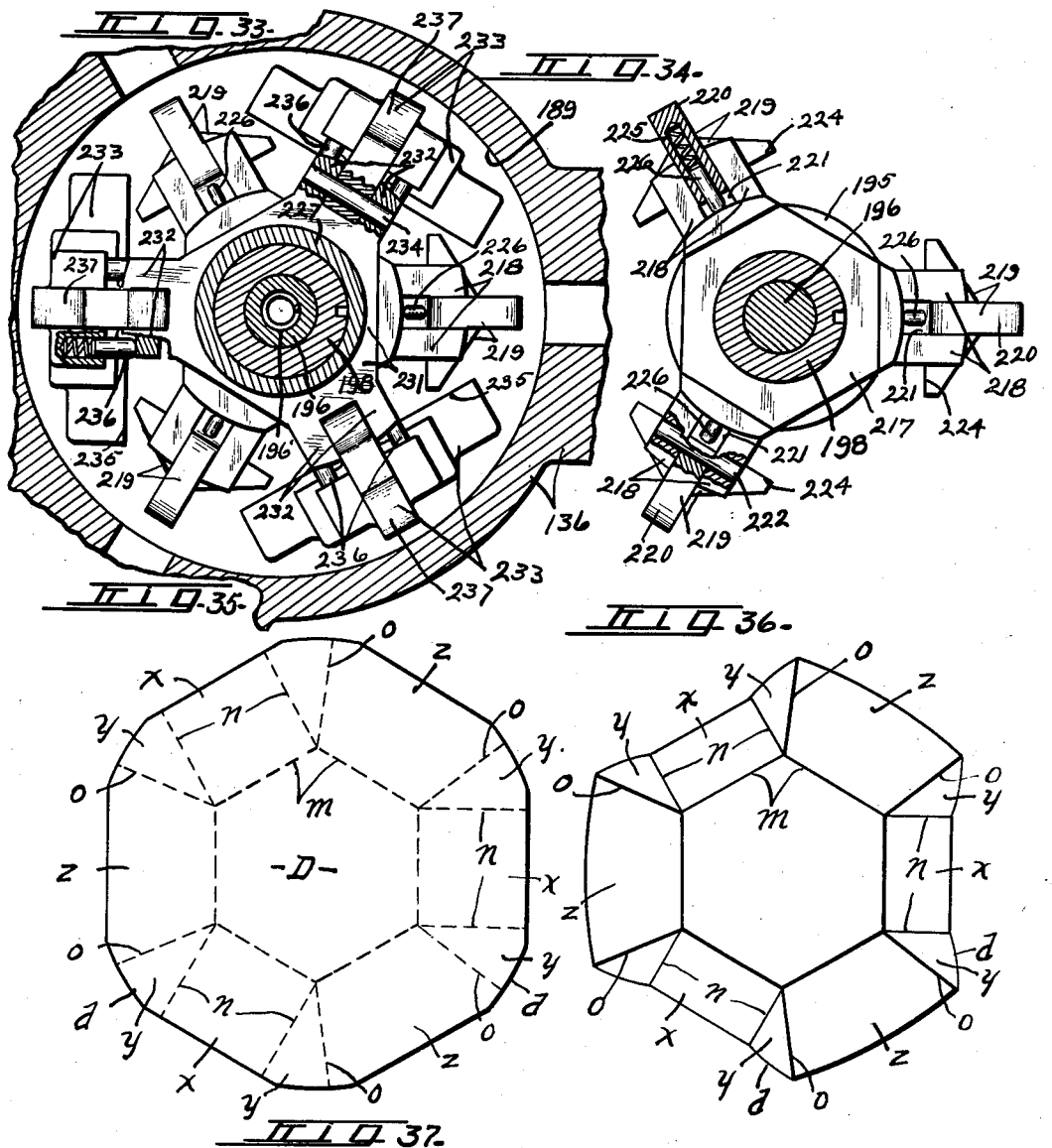
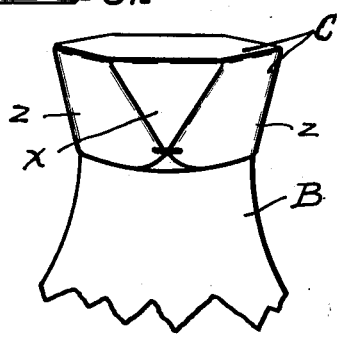

Patented Mar. 30, 1937

2,075,296

UNITED STATES PATENT OFFICE 2,075,296

BOTTLE-CAPPING MACHINE

Joseph Frank Mitchell, Parsippany, N. J., assignor, by mesne assignments, to Smith Hood & Seal Corporation, Syracuse, N. Y., a corporation of New York Application August 6, 1931, Serial No. 555,458

56 Claims. (Cl. 226—83)

This invention relates to improvements in bottle-capping machines, and pertains more particularly to a novel mechanism for applying a skirted cap over the mouth and around the neck of milk bottles or the like, for maintaining the mouth of the bottles in an uncontaminated, wholesome and sanitary condition.

In applying skirted caps to milk bottles by automatic machines heretofore employed where the body of the bottle is brought into operative alignment with the capping mechanism, it has been found, owing to a lack of uniformity in the structure of these bottles, that it is essential that the cap be brought into centralization with the mouth of the bottle and not merely with the bottle itself before being formed about the neck thereof to obtain a uniform or positive securing of the folds of the skirt together by stapling or otherwise, and to present a neat, uniform appearance of the periphery of the skirt.

The invention has for its principal object to provide a novel mechanism for automatically feeding a cap blank having a diameter greater than the mouth of the bottles to be capped over said bottles and to center the cap with the mouth of the bottles.

Another object is to provide means for automatically folding or plaiting the cap blank into a skirted cap in such a manner that the skirt of the cap will extend downwardly around the neck of the bottle.

A further object is to provide means for positively and firmly folding the plaited skirt of the cap about the neck of the bottle and then stapling or otherwise securing the plaits of the skirt together to form a tight and impervious enclosure for the bottle and, at the same time, to provide a closure which may be readily removed and which, when being removed, will be destroyed to such an extent that the cap cannot be re-used without detection.

A further object is to provide a simple, durable and efficacious means for intermittently carrying the bottles from a conveyor into operative relation with the cap-forming mechanism, and after the caps have been secured to the bottles, to again return the bottles to the conveyor in an upright orderly manner and without danger of breaking the bottles.

A still further object is to provide a bottle-carrying means which is adapted to be quickly and easily shifted so as to feed the bottles from either direction into and out of capping relation with the cap-forming mechanism.

Other objects and advantages relating to the structure of the apparatus and the form and relation of the parts thereof, will more fully appear from the following description taken in connection with the accompanying drawings in which:—

Figure 1 is a top plan of a machine embodying the various features of this invention and which is shown in conjunction with a suitable bottle conveyor which is indicated by dotted lines.

Figure 2 is an enlarged vertical detail section taken on line 2—2, Figure 1, illustrating the manner of supporting and operating my novel cap-forming and applying mechanism.

Figure 3 is a detail vertical section through the cam shaft, taken in the plane of the line 3—3, Figure 1.

Figure 4 is a detail sectional view taken in the plane of the line 4—4, Figure 3 with the cam section moved to the inoperative or at rest position.

Figure 5 is a face view of the drive clutch section taken in the plane of the line 5—5, Figure 3.

Figure 6 is a detail vertical sectional view taken in the plane of the line 6—6, Figure 3.

Figure 7 is a horizontal sectional view taken in the plane of the line 7—7, Figure 2.

Figure 8 is a detail sectional view through one side of the clutch member taken in the plane of the line 8—8, Figure 7.

Figure 9 is a vertical section taken on line 9—9, Figure 8.

Figure 10 is a detail vertical sectional view taken substantially in the plane of the line 10—10, Figure 21.

Figure 11 is a detail vertical sectional view taken on line 11—11, Figure 21, illustrating the bottle-lifting plunger and arm for actuating the same.

Figure 12 is a fragmentary plan view, partly in section, taken on line 12—12, Figure 2, and illustrating the cap blank feed plate bottle-lifting plunger and bottle carrier in operative relation.

Figure 13 is a detail horizontal sectional view taken on line 13—13, Figure 2, illustrating the bottle-actuated means for automatically controlling the operation of the machine.

Figure 14 is a detail sectional view taken on line 14—14, Figure 13.

Figure 15 is a detail sectional view taken on line 15—15, Figure 12.

Figure 16 is an enlarged detail vertical section taken substantially in the plane of the line 16—16, Figure 12.

Figure 17 is a detail horizontal sectional view taken on line 17—17, Figure 16.

Figure 18 is an enlarged detail vertical sectional view taken on line 18—18, Figure 13, illustrating the manner of pivotally mounting the bottle-actuated trip arm.

Figures 19 and 20 are fragmentary horizontal sectional views taken respectively on lines 19—19 and 20—20, Figure 18.

Figure 21 is a horizontal sectional view taken in the plane of the line 21—21, Figure 2.

Figure 22 is a detail sectional view taken on line 22—22, Figure 1, showing a face view of the bottle-capping operating lever and the cross head connected therewith.

Figures 23 and 24 are detail sectional views taken respectively on lines 23—23 and 24—24, Figure 22.

Figure 25 is a vertical sectional view through the cap disk mechanism, taken on line 25—25, Figure 1.

Figure 26 is an enlarged vertical sectional view of the bottle-capping mechanism taken substantially in the plane of the line 26—26, Figure 2, and illustrating the capping mechanism in the inoperative position ready to receive a bottle therein.

Figure 27 is a detail horizontal sectional view taken substantially in the plane of the line 27—27, Figure 26.

Figures 28 and 29 are detail vertical sections taken respectively on lines 28—28 and 29—29, Figure 27.

Figure 30 is a fragmentary plan view of the plait-forming plate taken on line 30—30, Figure 2.

Figure 31 is a vertical sectional view similar to Figure 26, illustrating the capping mechanism in the operative position with the head of a bottle having a folded cap thereon in operative relation with the folding mechanism.

Figure 32 is an enlarged detail horizontal section taken on line 32—32, Figure 31.

Figures 33 and 34 are detail horizontal sectional views through the cap-forming mechanism taken respectively on lines 33—33 and 34—34, Figure 26.

Figure 35 is a plan view of a cap blank.

Figure 36 is a plan view of the blank illustrated in Figure 35 showing the blank in a partly folded condition.

Figure 37 is a perspective view of the cap formed and secured upon the mouth of a bottle.

The apparatus, as illustrated in the drawings, consists of a frame 1, preferably composed of a bed plate 2 mounted upon vertically disposed legs 3. An electric motor 4 for driving the various units of the mechanism is secured to the frame 1 at the rear of one of the legs 3 and has the armature shaft 5 thereof connected through the medium of a suitable coupling 6 to the driven shaft 7 of a speed reducing unit 8 which is secured to the rear face of one of the legs 3 of the frame 1 with the drive shaft 9 thereof positioned coaxially with a cam shaft 10.

The drive shaft 9 is releasably connected with a cam shaft 10 by means of a clutch mechanism 11 secured to adjacent ends of said shafts. The clutch 11, in this instance, consists of an annular drive section 12 secured in any suitable manner to the upper end of the drive shaft 9, and a companion annular driven section 13 secured to the lower end of the cam shaft 10, as more clearly illustrated in Figure 3.

The upper face of the drive section 12 of the clutch 11 is provided with a slightly raised annular portion which is serrated to form ratchet teeth 14 formed with the upper faces thereof beveled for the purpose of driving the clutch section 13 in one direction only. The driven section 13 is releasably connected with the drive section 12 by means of a latch member 15 which is slidably mounted in a vertically disposed slot 16 provided in the periphery of the driven clutch section 13, see Figures 4, 5, 7, 8, and 9.

The clutch latch 15 is held in the slot against lateral displacement by means of a pair of guide plates 18 and 19, which are secured in any suitable manner in spaced relation to the periphery of the driven clutch section 13. The lower end of the latch 15 is beveled to conform to the contour of the face of the teeth 14 with which the latch is normally yieldingly held in engagement, by a coil spring 20 positioned in a vertically disposed hole formed in the upper end of the latch 15 with the upper end of the spring contacting with a spring-retaining plate 21 secured by screws or other means to the upper face of the clutch section 13.

The outer vertical edge of the latch 15 is provided with a transverse slot 22 which has the upper wall 23 thereof slightly beveled upwardly and forwardly with the rear lower edge of said beveled wall registering, when in the clutching position, with the lower wall 24 of an annular groove 25 formed in the periphery of the driven clutch section 13 intermediate the adjacent ends of the guide plates 18 and 19.

The groove 25 is of substantially the same depth as the slot 22 in the latch 15 and is adapted to receive therein one end of a latch release lever 27 which is pivotally connected at 28 to the lower face of one of the cam shaft brackets as 29, see Figure 21. One end 30 of the latch release lever 27 is adapted to travel in the groove 25 and has the inner edge thereof provided with an inwardly projecting flange 30' of substantially the same width as said groove and which has the inner vertical edge thereof slightly concave to conform to and engage the inner vertical wall 25' of the groove 25 when in the operative position in said groove.

The forward portion 30" of the upper face of the flange 30' is tapered forwardly and downwardly to form a knife edge at the forward end thereof for engaging the tapered wall 23 of the slot 22 for lifting the latch 15 against the action of the spring 20 and thereby automatically disconnect the clutch sections by bringing the latch out of engagement with the teeth 14 of the drive clutch section, as shown by dotted lines in Figure 9, and thereby permit the cam shaft 10 and the several units driven thereby to come to rest when the clutch release lever 27 is in the operative position, as illustrated by full lines in Figure 4.

The outer end of the latch release lever 27 extends a short distance outwardly beyond the pivot 28 and is pivotally connected by a pin 32 to one end of a horizontally disposed connecting rod 33 which extends forwardly in a plane below the bed plate 2 with the forward end thereof pivotally connected at 34 to the free end of a rock arm 35 which is secured to the lower end of a vertically disposed rock shaft 36 journaled in suitable bearings near the front of the machine, as will hereinafter be more fully explained.

Intermediate the pivot 28 and the outer end of the lever 27 is an integral forwardly extending arm 38 which has the forward end thereof curved at substantially right angles to the arm and towards the cam shaft 10 for rotatably supporting a studded roller 39 adapted to contact with the peripheral wall of the driven cam section 13 for limiting the outward movement of the latch engaging end 30 of the latch release lever 27.

The roller 39 is yieldingly maintained in contact with the clutch section 13 by a tension spring 40 connected at one end to the pin 32 and at the other end to a stud or bracket 41 secured to the adjacent rear portion of the frame 1.

A cam segment 42 is secured to or made integral with the periphery of the clutch section 13 and positioned at one side of the groove 25 in the plane of travel of the roller 39.

The forward end of the cam 42 is tapered inwardly for engaging the roller 39 to rock the lever 27 about its pivot 28 against the action of the spring 40 for the purpose of restoring the end 30 to its normal operative position within the groove 25 during a portion of a revolution of the clutch section 13 after the arm 27 has been moved by the action of the spring 40 to the inoperative position, as indicated by dotted lines in Figure 4, when released by the action of a bottle in the following manner:

The hereinbefore mentioned rock shaft 36 is journaled near its lower end in a suitable bearing 44 secured to or made integral with the frame 1 near the forward end thereof, see Fig. 21.

The upper end of the shaft 36 is journaled, as shown more clearly in Figures 13 and 16, in the bed plate 2 and extends above said bed plate a relatively short distance and has secured to the upper end thereof a collar 45 which engages the upper surface of the bed plate for maintaining the shaft 36 in its normal operative position.

Secured to the shaft 36 near the upper end thereof and positioned below the bed plate 2 is a rock arm 46 which is provided at its free end with an upwardly extending projection 46' which extends through a suitable elongated slot 47 provided, in this instance, in a cover plate 48 secured by screws 49 to the upper surface of the bed plate 2 to cover a suitable aperture 50 provided in the bed plate a relatively short distance from the front edge of said bed plate, as shown more particularly in Figures 13 and 16.

The upper end of the projection 46' of the rock arm 46 extends some distance above the bed plate 2 and is adapted to be engaged by a suitable pawl 51 which has the pivotal end thereof positioned in a curved slot 52 provided in the rear vertical wall of a curved pivot block 53 secured by screws 54 to the bed plate 2 adjacent the front wall of the aperture 50, as illustrated more clearly in Figures 13, 16, 18, 19, and 20.

The pawl 51 is pivotally secured to the block 53 by means of a shouldered screw 54'. The pivot block 53 is also provided with a pair of threaded holes 55 positioned near respective ends of said block at opposite sides of the pawl pivot 54 for receiving therein a screw 56 upon which is pivotally mounted at one end a trip arm 57. This trip arm 57 has the pivotal end thereof curved as illustrated in Figure 19 and positioned in the slot 52. The arm, as illustrated, extends from the pivotal screw 56 positioned in one of the threaded holes 55 through the slot 52 and extends forwardly beyond the front vertical edge of the bed plate 2 and has adjustably secured near the outer end thereof a roller 58 adapted to be engaged by a bottle as it enters a respective bottle-receiving recess 59 formed in a suitable bottle carrier 60 which will hereinafter be more fully described.

The roller 58, in this instance, is pivotally mounted upon a shouldered screw 61 which is adjustably secured by a nut 62 in an elongated slot 63 provided in the outer or free end of the arm 57. The trip arm 57, in this instance, is composed of two levers 57' and 57" comprising respective ends of the arm 57 and which have their adjacent ends positioned in overlapping relation and pivotally connected by a suitable shouldered screw 65. The levers 57' and 57" are also adjustably secured together against relative rotary movement by means of a clamping screw 66 which is secured to one of the arms as 57' and extends upwardly through an elongated slot 67 provided in the other lever 57" and made concentric with the pivot 65 so that the lever 57' may be adjustably secured at different angular relations to the companion lever 57" to bring the roller 58 into different relative positions with the recesses 59 of the carrier 60 so as to co-operate with bottles of different diameters in releasing the pawl 51.

The pawl 51 is normally maintained in operative relation with the rock arm 46 by means of a spring 68 which has one end thereof secured to the pawl and the other end engaging a suitable pin 69 secured to the rear vertical wall of the pivot block 53. The pawl 51 has secured thereto intermediate its ends, an upwardly extending pin 70 which, as shown more particularly in Figures 19 and 20, is positioned substantially midway between the holes 55 and extends upwardly through a suitable groove or notch 71 provided in the forward face of the trip arm 57 near the pivotal end thereof so that any inwardly rocking movement of the trip arm 57 will rock the pawl 51 about the pivot 54 against the action of the spring 68 out of engagement with the rock arm 46.

The object of providing the two threaded holes 55 in the pivot block 53 for the trip arm pivot stud 56 is to permit the trip arm 57 to be positioned at either side of the axis of the bottle carrier 60 for permitting the feeding of the bottles from either side of the bottle carrier to the bottle-capping mechanism. In other words, when the trip arm 57 and the bottle carrier 60 are arranged as illustrated in the drawings, the bottle conveyor as A, Figure 1, may be caused to travel from right to left, as indicated by the arrow X which will cause the bottles to be brought into operative relation with the carrier 60 at the right hand side of said carrier, and as the trip arm 57 is positioned at that side of the carrier, said bottles will engage said arm and cause the pawl 51 to rock about its pivot 54 and release the rock arm 46 secured to the vertical rock shaft 36 and thereby permit the spring 40 to actuate the clutch release lever 27 to bring the engaging end 30 thereof out of operative engagement with the latch 15; that is the latch lever will be moved from the full line position to the dotted line position, as illustrated in Figure 4, which will permit the latch 15 in the clutch section 13 to engage the teeth 14 in the drive clutch section 12 for the purpose of operatively connecting the cam shaft 10 with the drive shaft 9 of the reducing gear member 8 and, therefore, with the drive motor 4.

This engaging of the clutch 11 will, of course, cause the rotation of the cam shaft 10 and the operation of the various mechanisms connected therewith. This rocking movement of the latch lever 27 will be limited by the roller 39 coming in contact with the periphery of the clutch member 13, and it is evident that as the cam shaft 10 and the clutch member 13 continues the rotary movement, that the arm 27 will be restored to its normal operative position, with the free end 30 thereof positioned in the groove 25 by the cam 42 engaging the roller 39 to move the arm 38 outwardly from the clutch member 13.

As the latch release arm 27 is moved to the normal operative position, it is evident that the rock arm 46 will also be returned to its normal position where it may be engaged and maintained by the pawl 51, providing said pawl is permitted to be returned to its engaging position by the action of the spring 68 upon said pawl being released by the trip arm 57 as the bottle is moved away from said trip arm by the carrier 60. If however, the trip arm 57 should be engaged by another bottle, it is evident that the pawl 51 will be maintained out of engagement with the rock arm 46 and, therefore, permit the latch release lever 27 to be moved to its inoperative position by the action of the spring 40 as soon as the cam 42 has passed beyond the roller 39 which will permit the continued rotation of the cam shaft 10.

If, however, the trip arm 57 is released by the absence of a bottle in the recess 59 in the carrier 60, as soon as the latch release lever 27 has been rocked by the cam 42 into the normal operative position, said latch release lever will be maintained in said operative position by the pawl 51 engaging the rock arm 46, and as the shaft 10 continues rotating, the latch 15 will travel towards and be engaged by the cam face 30'' of the latch release lever 27 and thereby be moved out of engagement with the clutch teeth 14 which will dis-engage the clutch members and cause the cam shaft 10 to come to rest.

If, however, it is desirable that the conveyor A should travel in the opposite direction, that is, from left to right, the bottles may be fed to the capping mechanism from the left side of the carrier 60 by simply reversing the carrier end for end and the direction of rotation thereof, in a manner which will hereinafter be more fully explained, and the latch release lever 27 may be automatically operated by the bottles to permit the engaging of the clutch 11 by reversing the position of the trip arm 57. This reversing of the trip arm 57 may be accomplished by changing the pivot screw 56 from the hole positioned at the left side of the pivot block 53, as indicated in Figures 19 and 20, to the other hole 55 positioned at the right hand side of said block, and by extending the trip arm 57 outwardly from the left hand side or in the reverse direction shown in the drawings. This, however, will necessitate the turning of the trip arm 57 with the reverse side up whereupon the roller 58 may be positioned in the opposite side of said trip arm to that shown in the drawings in which position the trip arm will be in the same relation to the recesses 59 of the carrier 60 when said carrier is positioned with the reverse side up as it is with the carrier shown in the drawings for automatically causing the engagement of the clutch 11 in the manner hereinbefore described.

My novel bottle carrier 60, as hereinbefore indicated, is adapted to receive the bottles from a suitable conveyor as A and successively move the bottles substantially into cooperative relation with my novel cap-forming and applying mechanism, hereinafter more fully described, and after the caps have been secured to the bottles, to return said bottles to the conveyor A. This carrier 60, as shown more particularly in Figures 10, 12 and 16, consists of a hub 73 having flanges 74 provided at its opposite ends to which is secured by screws 75 a respective annular plate or disk 76. These plates 76 have their peripheral edges provided with a plurality of, in this instance six, aligned substantially semi-circular recesses 59. These recesses are equally spaced in each of the plates 76 circumferentially and extend inwardly from the periphery of the respective plates tangentially to the axis of the carrier at the rear of said axis when considered in relation to the direction of rotation of the carrier so that the rear wall of each recess 59 will form a slight pocket 59' for receiving and maintaining the bottles against radial displacement during the rotation of the carrier.

The carrier 60 is removably secured to the upper end of a vertically disposed shaft 77 between an enlarged annular flange 78 made integral with or secured to said shaft a short distance from the upper end thereof and a thumb nut 79 screw-threaded on the upper end of the shaft 77. The carrier 60, in this instance, is secured to the shaft 77 to rotate therewith by means of a key 80 operably mounted in the shaft 77.

It will be noted by referring to Figure 17 that the hub 73 of the carrier is provided with two grooves or keyways 81 in the wall of the opening therethrough. These keyways 81 are so positioned in relation with respective aligned recesses 59 in the plates 76 that the carrier may be used to feed the bottles in either direction to the bottle-capping mechanism; that is, when the conveyor A is traveling from right to left in the direction of the arrow X, Figure 1, the carrier 60 will be positioned, as shown in the drawings, with one of the recesses 59 at the right hand side of the carrier in position to receive a bottle from the conveyor, and when the carrier is rotated in an anti-clockwise direction, will bring the bottle from the conveyor into registration with the bottle-capping mechanism. If, however, the conveyor A is to travel in the opposite direction from left to right, the bottles may be taken from the conveyor at the left hand side of the carrier 60 and brought into registration with the capping mechanism by this same carrier by rotating the shaft 77 in a clockwise direction and by reversing the carrier end for end upon the shaft 77 and by having the key 80 engaging the previously idle keyway 81, which will position the carrier in such a manner that a recess 59 will be adapted to receive the bottles from the conveyor A at the left hand side of the carrier in the same manner in which the bottles are received when the conveyor is operated from right to left, as illustrated in the drawings.

The carrier shaft 77 is rotatably mounted in suitable bearing members 83 and 84 mounted in respective ends of a vertically disposed bore 85 formed in a dependent extension 86 made integral with the bed plate 2 between the forward edge of said bed plate and the pivot block 53, see Figures 10, 13, and 16. The upper positioned bearing as 83 extends, as illustrated, some distance above the upper face of the bed plate 2 for the purpose of maintaining the carrier 60 in spaced relation with the bed plate 2 so that the plates 76 will engage the body of the bottles intermediate the ends of the bottles so as to maintain the bottles in their normal upright position while effecting the intermittent movement thereof.

The lower positioned bearing member 84 is constructed as shown more particularly in Figure 10, with an upwardly extending annular portion 87 adapted to be engaged in the opening 85 and which is secured thereto by any suitable means such as a set screw 88. The bearing member 84 is also provided with a second bearing portion 89 positioned below the member 87 in spaced relation thereto and adapted to rotatably support the shaft 77 therein. The portion 89 is connected with the portion 87 of the bearing member 84 by means of a suitable housing 90 adapted to receive a beveled gear as 91 therein, as illustrated by dotted lines in Figure 10.

The portion 89 of the bearing member 84 is also provided with a downwardly extending skirt or housing 92 adapted to enclose the gear 91 when positioned upon the shaft 77 below the bearing member 89, as illustrated by full lines in Figure 10.

The carrier shaft 77 may be operated for intermittently rotating the carrier 60 to bring the bottles into successive operative relation with the capping mechanism by any suitable means.

The carrier, as illustrated in the drawings, is intermittently rotated the distance between two adjacent bottle-receiving recesses 59 by the cam shaft 8 at each revolution of the cam shaft in the following manner:

Two shafts 93 and 94, Figures 7 and 10, are disposed in parallel spaced relation in substantially the same horizontal plane longitudinally of the frame 1 and below the bed plate 2. These shafts are journaled in respective bearing members 95 and 96 secured to or made integral with the frame 1, and are positioned with their inner adjacent ends extending in slightly overlapping relation and are operably connected with each other by a suitable Geneva movement such as a star wheel 97 secured to the shaft 93 and an actuating arm 98 secured to the shaft 94, see Figure 6.

The forward end of the shaft 93 has secured thereto a beveled gear 99 adapted to have meshing engagement with the beveled gear 91 secured to the carrier shaft 77.

The rear end of the shaft 94 is likewise connected with the cam shaft 10 by a pair of beveled gears 100 and 101 secured respectively to the shaft 94 and cam shaft 10, see Figures 2 and 3.

It will be noted by referring to Figure 6 that the star wheel 97 is provided, in this instance, with six radial slots 102 adapted to operably receive therein a roller 103 rotatably secured to the arm 98 so that upon each revolution of the cam shaft 10, and, therefore, the horizontal shaft 94, the star wheel 97 and shaft 93 will be rotated one-sixth of a revolution which will in turn impart a like movement to the carrier shaft 77 through the gears 91 and 99 and also to the carrier 60.

It will be evident by referring to Figure 10, that when it is desired to rotate the carrier 60 in the opposite direction for feeding the bottles from the left hand side of the carrier to the bottle-capping mechanism, that it is only necessary to position the gear member 91 at the opposite or upper side of the gear 99 in the housing 90, as indicated by dotted lines, which will, of course, rotate the carrier 60 in the opposite or clockwise direction.

In order that the bottles may be directed into the respective recesses 59 of the bottle carrier 60 and be maintained therein during the intermittent movements of the carrier, I have provided a pair of bottle guide members 105 and 106 which are secured to the bed plate 2 in operative relation with the periphery of the carrier 60, see Figures 1 and 12.

The guide member 105 is secured by screws 107 or other suitable means, to the bed plate 2 and extends forwardly from the bed plate so as to be positioned over the bottle conveyor A and is provided at either side with outwardly extending arms 105' and 105" adapted to extend in opposite directions from the center of the guide over the conveyor A. The forward or receiving end as 105' of the guide is tapered from the outer end thereof inwardly towards the axis of the carrier 60 for guiding the bottles as they are carried forward by the conveyor into a registering recess 59 in the carrier 60, as shown.

The opposite or exhaust side 105" of the guide member 105 is formed, as shown more particularly in Figure 12, adapted to receive the bottles from the registering recess 59 as they are discharged from the carrier 60 and guide said bottles along the conveyor A for a relatively short distance for maintaining the bottles in an upright position on said conveyor. The other guide member 106 is secured to the bed plate 2 by screws 108 in slightly spaced relation with the inner peripheral portion of the carrier 60 and has the receiving end 106' and the exhaust end as 106" of said bracket positioned in co-operative spaced relation with the respective receiving and exhaust ends 105' and 105" of the guide member 105 for guiding bottles therebetween.

It will be observed by referring to Figure 12, that the exhaust end 106" of the bracket 106 is so positioned relative to the carrier 60 that the bottles will be maintained in respective recesses 59 as they approach the conveyor A, until after the carrier has passed its center of movement and, therefore, the period of greatest speed so that the bottles will not be permitted to leave said recesses until near the end of the rotary movement of the carrier when said carrier is operating at reduced speed as it approaches the at rest position and thus cause the bottles to be discharged from the carrier onto the conveyor A in a relatively, slow, easy manner so as to prevent breakage of the bottles and to maintain said bottles in the upright position as they are deposited on the conveyor.

Secured to the inner vertical wall of the bracket 106 is a plurality of, in this instance three, spring members 109. These spring members 109 are so positioned in circumferential spaced relation about the bracket 106 that when the carrier 60 is being rotated at its greatest rate of speed, that is, midway of the intermittent movement thereof, the spring members 109 will be in registration with the respective recesses 59 and engage the bottles contained in said recesses for maintaining the bottles therein at the time they are being influenced by the greatest centrifugal force.

The bottle carrier 60, as hereinbefore described, is adapted to operate with obverse and reverse sides positioned uppermost for carrying bottles in either direction from the conveyor A into capping relation with a cap-forming and applying mechanism, but it is evident that the guide members 105 and 106 are only adapted to co-operate with the carrier 60 in guiding the bottles in one direction only, and if the bottles are to be moved in the opposite direction, it is necessary to replace the guide members 105 and 106 with similar guide members which are adapted to co-operate with the carrier 60 for guiding the bottles in the reverse direction.

*Bottle-actuating plunger*

As the carrier shaft 77 is operably connected with the source of power as the motor 4 by the engagement of the clutch 11 in the manner previously described, the carrier 60 will be rotated, in this instance, one-sixth of a revolution or the distance between two adjacent bottle-receiving recesses 59 and when the carrier is rotated in an anti-clockwise direction, as illustrated in the drawings, the bottle will be moved, during a single intermittent movement of the carrier, from the conveyor A over the upper surface of the bed plate 2 and will come to rest upon the upper end of a vertically disposed reciprocating plunger 110 which is slidably mounted in a pendent vertically extending hollow boss or bearing member 111 made integral with the bed plate 2, see Figures 2, 11, 12, and 21.

The plunger 110, in this instance, is circular in cross section and has an easy sliding fit in the opening of the supporting member 111 thereby forming a relatively close connection between the plunger and the bed plate 2 which prevents liquid such as wash water, spilt milk, or the like, from passing downwardly through the plunger opening and corroding or polluting the mechanism below the bed plate 2.

The plunger 110 is moved vertically to carry the bottles to and from their cap-receiving position by a rearwardly extending substantially horizontally disposed rock arm 112 which is pivotally mounted intermediate its ends upon a shouldered stud 113 secured to the frame 1 near the rear portion thereof. The rear end of the arm 112 is provided with a roller stud 114 which engages a cam groove 115 in a cam member 116 which is secured in any suitable manner to the cam shaft 10 to rotate therewith.

The forward end of the arm 112 extends through a vertically disposed slot 111' provided in the rear wall of the supporting member 111 and terminates in a vertical recess or slot 117 which extends diametrically through the plunger 110 near the lower end thereof.

The forward end of the arm 112 is of less vertical height than the slot 117 in the plunger 110 and is positioned between an adjusting screw 118 screw-threaded in the lower end of the plunger 110 and a spring-actuated pin 119 mounted in a suitable opening in the upper end of the plunger.

The spring as 120 for actuating the pin 119 is of sufficient tension to maintain the arm in constant contact with the screw 118 under normal load and, at the same time, provides a yielding connection between the arm and plunger 110 so that the bottle may be brought to the capping position without danger of damaging the bottle or the capping mechanism. The upper end of the plunger 110 may be positioned and maintained flush with the upper surface of the bed plate 2 when the plunger is in its lowermost position, by the manipulation of the screw 118 which may be locked in the adjusted position in any suitable manner as by a lock nut 121. The positioning of the plunger 110 flush with the upper surface of the bed plate 2 is for the purpose of permitting the bottles to be smoothly positioned upon the plunger 110 as it is moved by the carrier 60 from the upper surface of the bed plate 2.

Bottle-capping mechanism

The hereinbefore-mentioned bottle-capping mechanism, in this instance, consists primarily of a cap blank feeding apparatus adapted to automatically feed one cap-forming blank at a time over the mouth of a bottle resting upon the plunger 110, a cap-forming mechanism adapted to form the disk into a skirted cap over the mouth of the bottle and at the same time to plait the skirt of the cap, a mechanism for closely and securely folding the plaits about the neck of the bottle and a suitable means for securing the skirted cap in position on said bottle such as a stapling mechanism, all of which are mounted in co-operative relation with each other and with the bottle plunger 110 upon a vertically disposed supporting post 123, see Figure 2.

The post 123 may be adjustably mounted for vertical longitudinal movement in the bore of a pendent supporting member 124 secured to or made integral with the bed plate 2 for the purpose of varying the relative position of the capping mechanism and the bottle-supporting plunger 110 for permitting the capping of bottles of different heights. The supporting post 123 is positioned at the rear and to one side of the axis of the bottle carrier 60 and is splined to the supporting member 124 by a key 125 secured to the post to move therewith and registering in a longitudinally disposed keyway provided in the bore of the projection 124 so as to prevent rotation of the shaft during the adjustment thereof and for maintaining the capping mechanism in co-axial relation with the plunger 110. The post 123 may be adjustably maintained in a pre-determined fixed position by any suitable means as a lifting collar 127 mounted upon the reduced lower end of the post 123.

The collar 127 is formed, as shown in Figure 7, with a lateral projection as 127' having a vertically disposed threaded opening therethrough in which is screw-threaded an adjusting screw 128. This screw 128 may be rotatably supported against axial movement in any suitable manner in the frame 1 and may be manipulated in any suitable manner as by a hand wheel 129 secured to the screw. The post 123 may thus be elevated or lowered at will by the proper manipulation of the hand wheel 129 and then secured in the adjusted position against axial movement by means of a pair of clamping sleeves 130 and 131 slidably mounted in a suitable bore provided in a horizontally disposed boss 132 formed integral with the frame 1 and extension 124, as illustrated in Figure 21, said bore being disposed tangentially to and partially intercepting the bore in the extension 124 so that by positioning the sleeves 130 and 131 in spaced relation at opposite sides of the post 123, the adjacent ends of the sleeves may be brought into clamping engagement with the post 123 by means of a locking screw 133 which extends through the outer sleeve 131 and is screw-threaded in the inner sleeve 130.

The supporting post 123 extends some distance above the bed plate 2, and as shown more particularly in Figure 2, is provided with a reduced portion 123' intermediate the upper end thereof and the bed plate 2 for supporting the cap blank feed plate as 135 while the upper end 123'' of the post 123 is still further reduced in diameter for supporting a capping head member 136 and a lever-supporting ring 137, both of which are fixedly secured to the post to prevent relative rotary movement thereof by means of a key 138 which is positioned in registering slots provided in the end 123'' of the post 123 and in respective apertured hubs 136' and 137' made integral with the capping head 136 and ring 137 and positioned at one side thereof.

The lever-supporting ring 137 is mounted over the capping head 136 and is maintained in fixed spaced relation thereto by the hub 137' engaging the upper surface of the hub 136' and also by a vertically disposed spacing stud 139 positioned diametrically opposite the supporting post 123, said stud being screw-threaded in the head 136 and having its upper end reduced in diameter and extending through a suitable aperture in the ring 137 and clamped thereto by a nut 140 screw-threaded upon the upper end of said spacing stud 139.

*Cap blank feed mechanism*

The caps as C, Figure 37, are preferably made from a disk as D, Figure 35, which is hexagonal in plan view and has the corners as *d* thereof rounded so that when the cap is applied to the bottle as B, the lower or peripheral edge of the skirt of the cap will present a neat, regular appearance about the neck of the bottle, and at the same time, provide for the maximum, even, close and firm fitting of the skirt about the neck of the bottle and thereby prevent the bottle being contaminated by dust or dirt passing upwardly between the skirt of the cap and the bottle.

These disks or cap blanks D are stacked one upon the other in a suitable magazine 141, Figures 1 and 25, and supported in any suitable manner at one side of the capping head 136 as by a bracket 142 secured to or made integral with the head 136, said bracket being split radially at one side thereof and having the split sections secured together in clamping engagement with the magazine 141 intermediate the ends of said magazine by a clamping screw 143.

The magazine 141 is a tubular member, open at both ends, and having the opening therethrough formed substantially hexagonal in cross section for maintaining the disks D in predetermined fixed relation so that when said disks are brought over the mouth of the bottles, the flat sides of the disk will be in operative relation with the skirt-forming and folding mechanism, hereinafter more fully described.

The magazine 141 is maintained in fixed relation over the disk feeding plate 139 with the lower end thereof maintained in juxtaposition to the upper surface of said plate so as to feed the cap blanks one at a time into a relatively shallow disk-receiving recess 145 provided in the forward end of the disk feeding plate 135 when said recess is in registration with the magazine 141 which will be effected when the plate 135 is in its rearmost position. The feed plate 135, as shown more particularly in Figures 2 and 12, in this instance, is substantially flat in cross section with a width slightly greater than the diameter of the magazine 141 and is formed concentric with the cap mechanism supporting post 123.

The plate 135 is provided with a radial arm 146 which extends from the inner edge thereof and terminates in a vertically disposed tubular hub 147 which is rotatably mounted on the intermittent reduced portion 123' of the supporting post 123 between the capping head 136 and a thrust washer 148 which is maintained in operative position on the post 123 by means of a nut 149 screw-threaded on the upper end of the major portion of the post 123, said nut being maintained in the adjusted position by a set screw 150 screw-threaded in the side of the nut and adapted to engage the periphery of the post 123. This construction not only permits the free rotation of the feed plate 135 upon the post 123, but causes said plate to be moved axially with the post 123 in fixed relation with the head 136 during the axial adjustment of the post 123 to bring the feed plate in a horizontal plane just above the head of the bottle B when the bottle-supporting plunger 110 is in its extreme down position to permit the positioning of cap blanks over the mouth of bottles of different heights.

The feed plate 135 is oscillated horizontally about the post 123 to bring the disk-receiving recess 145 from registration with the magazine 141 into alignment with the bottle to be capped, and a cap-forming and applying mechanism, presently described, and vice-versa, by a cam member 151 keyed or otherwise secured to the upper end of the cam shaft 10 to rotate therewith, see Figures 1 and 3. The cam 151 is operatively connected to the feed plate by means of a horizontally disposed rock arm 152 which is pivotally mounted intermediate its ends upon a vertically disposed shouldered stud 153 which, in this instance, extends downwardly through an upwardly extending lug 154 made integral with the upper positioned cam shaft bearing 155 and has the lower end thereof screw-threaded in the adjacent portion of the bed plate 2.

The rear end of the rock arm 152 is provided with an upwardly extending roller stud 156 adapted to travel in a cam groove 157 formed in the lower face of the cam member 151. The other or forward end of the rock arm 152 is provided with a gear segment 158 having meshing engagement with longitudinally disposed teeth 159 formed on the periphery of the hub 147 so that any rocking movement of the arm 152 produced by the cam 151, will impart a corresponding oscillating movement of the feed plate 135 through the medium of the gear segment 158 and teeth 159.

It is evident, by referring to Figure 2, that the plate 135 may be moved axially by the post 123 within the limits desired due to the length of the teeth 159 upon the hub 147 which are so constructed that the gear segment 158 will always be in mesh with the gear teeth 159 without the necessity of varying the vertical position of the arm 152 and the cam member 151.

The feed plate 135 is of sufficient length circumferentially to remain in registration with the magazine 141 during the forward feeding movement of said plate for preventing the displacement of the paper disks contained in the magazine when the plate is in its foremost position with the recess 145 in co-axial relation with the cap-forming and applying mechanism.

The disk-receiving recess 145 has, as shown more particularly in Figures 12 and 27, the peripheral wall thereof provided with a plurality of, in this instance three, flattened surfaces 145' arranged at the rear side of the opening and formed by securing a like number of bars 160 in any suitable manner in corresponding grooves formed in the plate 145 adjacent said recess and arranged at sixty degrees to each other and adapted, when the feed plate 135 is in its rearmost position, to be in operative relation with corresponding flattened sides of the magazine 141 for maintaining the disk blanks in their proper relation with the cap-forming mechanism during the feeding of said blanks from the magazine into position over the mouth of the bottles.

The bottom of the disk-receiving recess 145 may, as shown in Figures 12, 15, and 27, be provided with a plurality of relatively small openings 161 spaced circumferentially about said bottom and connected with a common chamber 162 formed in the feed plate 135 below the recess 145 and which may be connected in any suitable manner as by a flexible hose 163 with a vacuum pump, not shown, for producing a partial vacuum beneath the cap blanks when positioned in the recess 145 for maintaining said blanks against displacement during the carrying of the blanks from the magazine to a position over the mouth of the bottles to be capped, said hose being connected at one end by a port 164 and tube 165 with the chamber 162.

The forward end of the disk-feeding plate 135 is also provided with an inwardly extending substantially semi-circular opening 166, with the inner or rear portion thereof formed concentric with the disk-receiving recess 145 and of greater diameter than that of the bottles to be capped so that when the plate 135 is in its forward position, the opening 166 will be in co-axial relation with the bottle-lifting plunger 110 to permit the free movement of the bottles therethrough during the vertical movements of said plunger.

When the disk feed plate 135 is in its extreme forward position with the opening 166 and the disk-receiving recess 145 in co-axial relation with the bottle-actuating plunger 110, it is necessary that the mouth of the bottle resting upon the plunger be brought into concentric relation with the cap blank positioned in the recess, and for this purpose, there is secured to the undersurface of the plate 135 adjacent the opening 166 a pair of positioning blocks 167 which are secured in fixed relation to the feed plate by bolts or screws 168 passing through suitable apertures in a tie bar as 169 made integral at its ends with the positioning block 167 and which are screw-threaded into the plate 135.

The positioning blocks 167 are arranged equal distances either side of the circumferential center line of the plate 135 and the disk-receiving recess 145 and, therefore, of the bottle-receiving opening 166. Each of the blocks 167 extends within the opening 166 a relatively short distance and have the inner vertical faces thereof positioned so as to be tangential to the periphery of the rim b of the mouth of the bottle B, Figure 32, when said mouth is in concentric relation with the cap blank contained in the recess 145 so that when the rim b of the bottle is brought into contact with the fixed positioning blocks 167, the mouth of the bottle will be in concentric relation with the disk-receiving recess 145 and, therefore, with the cap blank positioned in said recess.

As the bottles B are being moved upwardly through the bottle-receiving opening 166 in the feed plate 135 by the action of the plunger 110, it is necessary that the rim b of the mouth of the bottle is brought into contact with the inner vertical end surfaces of the fixed positioning blocks 167, and for this purpose, the lower edges of these surfaces as 167' are beveled, as illustrated in Figure 26, and there is also provided a second pair of positioning blocks 170 arranged in diametrically opposed relation with the fixed blocks 167 for cooperating therewith. These movable positioning blocks 170 are constructed similarly to said fixed blocks except that they are reciprocally mounted in a suitable bracket 171 secured by screws 172 to the underside of a plait-forming plate or die 173 which, in turn, is secured by any suitable means as by screws 174, Figure 2, to the undersurface of the capping head 136, as illustrated more clearly in Figures 2 and 26 and which will hereinafter be more fully described.

The bracket 171, as illustrated more clearly in Figures 26, 27, 28, and 29, is a substantially rectangular block arranged to be adjacent the mouth of the opening 166 in the feed plate 135 when said feed plate is in its forward position. The bracket 171 is provided with a horizontally disposed slot or guideway 175 extending longitudinally therethrough for receiving a lateral supporting arm or plate 176 connected at one end to the tie bar as 177 for the movable positioning blocks 170.

Pivotally mounted upon a shouldered stud 178 secured to a lateral arm 179 formed integral with one side of the bracket 171, is a rock arm 180 which has one end extending through a suitable slot 181 provided in the side of the bracket 171 adjacent the arm 179 and over the block-supporting plate 176. The rock arm 180 has a pin and slot connection with said plate so that any rocking movement of the arm will impart a corresponding sliding movement of the plate. The other end of the arm 180 extends a relatively short distance beyond the pivot 178 and is provided with a spring-pressed plunger 182 adapted to be engaged by the inner end portion 135' of the forward end of the feed plate 135 as said plate approaches the limit of its forward movement for yieldingly rocking the arm 180 about the pivot 178.

The plate 176 and, therefore, the positioning blocks 170 are yieldingly maintained in their normal outermost position by means of a spring 183 of less tension than the spring for the plunger 182 and which is coiled about a suitable screw or stud 184 secured to the arm 179 of the bracket 171 and having one end thereof positioned against the side of the bracket and the other end engaging the outer end of the rock arm 180 for urging the outer end of the arm toward the feed plate 135 and thereby normally maintaining the positioning blocks 170 a distance from the fixed positioning blocks 167 which is greater than the diameter of the body of the bottles to be capped so as to permit the free vertical movements of the bottles into and out of capping relation with the cap-forming and applying mechanism.

In operation, it will be clearly understood, by referring more particularly to Figure 27, that when the feed plate 135 is in its outer position with the recess 145 in registration with the magazine 141, the movable positioning blocks 170 wi'l be maintained in their normal outermost position by the action of the spring 183, and as the feed plate 135 approaches its innermost position over the bottle-actuating plunger 110, the pin 182 will be engaged by the end portion 135' of the plate which will rock the arm 180 about the pivot 178 and against the action of the spring 183 to bring the movable positioning blocks 170 towards the approaching fixed positioning blocks 167, and the construction of the arm 180 and plunger 182 is such that the movable positioning blocks 170 will be positioned, when the feed plate 135 comes to rest, at a less distance from the fixed blocks 167 than the diameter of the rim b of the mouth of the bottle B to be capped, as indicated by full lines, Figure 27.

As the bottle B is then being moved upwardly by the action of the plunger 110, the rim of the mouth of the bottle will engage the under beveled portions of the respective positioning blocks 167 and 170 and cause the movable blocks 170 to be moved outwardly against the action of the spring as 185 for the pin 182 until the movable blocks 170 are moved a sufficient distance from the fixed blocks 167 to permit the rim b of the mouth of the bottle to pass therebetween and thereby automatically positioning the mouth of the bottle in concentric relation with the cap blank contained in the recess 145.

As the bottle B continues its upward movement it will pick up the cap blank carried by the plate 135, and as soon as the blank is removed from said plate, the plate will begin its rearward movement to bring the disk-receiving recess 145 in registration with the magazine 141 due to the particular construction of the actuating cam 151 therefor. This return movement of the plate 135 will, of course, move the fixed positioning blocks 167 away from the path of movement of the bottle and, at the same time, permit the spring 183 to return the movable positioning blocks 170 to their normal outermost position out of the path of movement of the bottle and thereby permit the free movement of the bottle as it is brought into and out of capping relation with the cap-forming and applying mechanism.

*Cap-forming and plaiting apparatus*

Associated with the cap blank feed plate 135 and bottle-supporting plunger 110 is the hereinbefore-mentioned plait-forming plate 173 which is maintained by the capping head 136 in a horizontal plane a relatively short distance above the feed plate 135. The plait-forming plate 173 is provided with a central opening 188 and is arranged in concentric relation with an inwardly extending bore or chamber 189 provided in the lower face of the capping head.

The opening 188 in the plate 173 and the chamber 189 in the head 136 are arranged in vertical alignment with the bottle-supporting plunger 110 and, therefore, with the bottle B positioned on said plunger by the carrier 60 in a manner hereinbefore explained and are adapted to receive the head of the bottle as said bottle is being elevated by the action of the plunger.

The opening 188 in the plate 173 is formed with a plurality of, in this instance three, arcuate portions 190 of substantially equal lengths and which are arranged in substantially equal spaced relation circumferentially. These arcuate portions 190 are of greater diameter than the bottles to be capped so as to permit the free movement of the bottles therethrough during the cap-forming and applying operation. Connecting these arcuate portions 190 of the opening 188 are three substantially flat portions 191 arranged tangentially to a circle passing through the arcuate portions 190 and at substantially right angles to the radial line passing midway between said arcuate portions, as illustrated more clearly in Figure 30.

The undersurface of the plate 173 adjacent the opening 188 is curved or beveled as at 192 to form a suitable guide for the upper end of the bottle as it is moved upwardly through said opening. The purpose of forming the opening 188, in this manner, is for folding the skirt of the cap over the mouth of the bottle as the bottle and cap blank carried thereby are moved upwardly through the opening 188 as will be presently more apparent.

The cap blank or disk D has the central portion thereof of one face provided with score lines m, as indicated by dotted lines in Figure 35, to form a hexagonal outline of sufficient size to circumscribe the rim b of the mouth of the bottle B.

Extending from the corners of alternate sides of the scoring lines m are score lines n extending to the adjacent side of the disk in parallel relation to form a substantially rectangular portion x. Other score lines as o extend from each of these corners to the periphery of the circular portion d at an acute angle to the adjacent score lines n to form triangular portions y intermediate the rectangular portions x and a somewhat larger conical portion z, and by the proper placing of these blanks in the magazine 141, they will be arranged, when positioned by the carrier 135, over the mouth of the bottle to be capped with the rectangular scored portions x of the disk in vertical alignment with a respective arcuate surface 190 of the opening 188 in the plait-forming plate 173, and this, of course, will arrange the conical portions z in vertical alignment with the flat portions 191 of the opening 188.

It is now evident that when the lowermost disk or cap blank D is fed forwardly by the feed plate 135 from the magazine 141 over the mouth of the bottle B, the raising of the bottle-supporting plunger 110 will force the head of the bottle up through the bottle-receiving opening 166 in the plate 135 and between the positioning blocks 167 and 170 for bringing the head of the bottle into co-axial relation with the capping blank, in the manner hereinbefore explained, and then as the bottle continues its upward movement, it will come into contact with the disk at the central portion thereof within the margin of the score lines n and carry said blank upwardly through the opening 188 in the plait-forming plate 173 and into the chamber 189 in the capping head 136.

During this upward movement of the bottle, the central portion of the cap overlying the mouth of the bottle will be pressed into engagement with an aligned platen 195 secured to the lower end of an upright plunger 196. This plunger 196 is guided in a vertical central opening or bore 197 provided in the lower end of a vertically disposed post 198 which extends upwardly through a central opening or bore 199 provided in the head 136 and which extends from the chamber 189 through an upwardly projecting post 200 secured to or made integral with the upper face of the head 136, Figures 2, 26, and 31.

The upper end of the plunger 196 is provided with a central opening 196' for receiving a compression spring 201 which has the upper end thereof positioned in the upper end of the bore 197 for yieldingly maintaining the platen 195 in its lowermost position against a limiting stop or pin 202 secured in the post 198 tangentially to the bore 197 and adapted to extend through a groove or slot 203 formed by flattening an adjacent portion of the periphery of the plunger 196, said slot 203 being of such a length as to permit the desired vertical movement of the platen 195.

The bore 199 in the post 200 and head 136 is divided intermediate its ends into two major bores 199' and 199'' by an inwardly projecting annular flange 204.

The diameter of the portions 199' and 199'' of the bore 199 is greater than the diameter of the post 198 while the diameter of the opening through the flange 204 is substantially the same diameter as that of said post 198 for guiding the upper end of the post during the vertical movement thereof.

A pair of diametrically opposed pins 205 are mounted in the post 200 to extend through the flange 204 and have their inner ends positioned in respective vertically extending longitudinal grooves 206 formed in the periphery of the post 198 for preventing relative rotary movement of the posts 198 and 200.

The upper end of the post 198 is slightly reduced in diameter and has frictionally mounted thereon an annular ring or washer 207 which is pressed and frictionally maintained in engagement with the shoulder formed by said reduced portion of the post 198. The ring 207 is positioned in the upper portion 199' of the bore 199, and when the post 198 is in its lowermost position, it is adapted to engage the upper surface of the flange 204 for maintaining the post against further downward movement, as illustrated more particularly in Figure 26.

Slidably mounted in the upper end of the bore 199 is a tubular plunger 209 which has the lower end 210 of the interior thereof reduced in diameter for slidably engaging the upper end of the post 198 which extends through said opening and has secured to the reduced upper end thereof a washer 211 of substantially the same diameter as the upper end of the opening through the plunger 209 and which is maintained in position by a pair of lock nuts 212 for limiting the upward movement of the plunger 209.

The plunger 209 extends some distance above the upper end of the post 200 and is maintained in contact with the forward end of a bellcrank lever 214 when said end of the lever is in its lowermost position by means of a helical spring 215 positioned in the bore 199 between the lower end of the plunger 209 and the ring 207 which construction, as is evident, constantly urges the post 198 towards its lowermost position with the ring 207 resting upon the upper surface of the flange 204.

The lower end of the post 198 extends downwardly into the chamber 189 of the capping head 136, and is provided with an outwardly extending radial flange or head 217 which, when the post is in its lowermost position, is located within a short distance above the lower face of the head 136.

The head 217 is provided, as illustrated more particularly in Figures 26, 31, and 34, with a plurality of, in this instance three, pairs of spaced radial ears 218 arranged in uniform circumferentially spaced relation.

Pivotally mounted between each pair of ears is a respective cap folding finger 219. Each of these fingers 219 is aligned with a respective arcuate portion 190 of the opening 188 in the plait-forming plate 173.

The upper portion 220 of each of these fingers 219 is made substantially equal in width to the slot 221 formed by the ears 218, and is pivotally mounted in said slot intermediate its ends upon a pin 222 which has the ends thereof secured in the ears 218, at respective sides of the slot 221.

The lower ends of the fingers extend a relatively short distance below the head 217, and each has its inner side concaved vertically to form a shoulder 223 while the sides are extended laterally to form a relatively broad folding surface 224, below the shoulder 223 of substantially the same or slightly less width than the arcuate portion 190 of the opening 188, or in other words, substantially equal to that of the transverse width of the rectangular portion $x$ of the cap blank D, and the central portion of the bearing surfaces 224 of each of the fingers 219 are slightly concaved to conform to the curvature of the rim $b$ of the mouth of the bottle, as illustrated more particularly in Figure 32.

The lower portion of the fingers 219 are for the purpose of co-operating with respective arcuate portions of the plait-forming plate 173 in forming and folding the portions $x$ of the skirt of the cap blank, and for maintaining the inner edge of said portion in contact with the rim of the mouth of the bottle during the cap-applying operation, as will hereinafter more clearly appear.

The upper end of each of the fingers 219 is provided with a socket 225 in which is mounted a spring-actuated plunger 226, which has the outer end thereof in engagement with the inner wall of the slot 221 for yieldingly maintaining the lower end of the finger in its innermost position which is determined by a portion of the inner vertical wall of the fingers below the pivot 222 engaging the adjacent inner wall of the slot 221, when the post 198 and therefore the head 217, are in their lowermost position. (See Figure 26.)

This inner normal position of the fingers 219 is such that the lower ends thereof will be diametrically spaced a distance substantially equal to or slightly less than the outer diameter of the rim $b$ of the mouth of the bottle to be capped so that said fingers will be rocked about the pivots 222 against the action of the spring-pressed plunger 226 for causing the fingers to yieldingly engage the adjacent portion of the cap blank to prevent the unfolding of the blank after said blank has passed through the opening 182 in the plait-forming plate 173, and to yieldingly but firmly maintain said portion in contact with the peripheral surface of the rim of the mouth of the bottle.

Surrounding the lower portion of the post 198 and slidably mounted in the bore 199" is a sleeve 227 which is yieldingly urged downwardly by a spring 228 positioned in said bore between the upper edge of the sleeve 227 and the lower face of the flange 204.

The vertical movement of the sleeve 227 is limited by a stop pin 229 secured in the post 200, and adapted to extend through a slot 230 formed by flattening one side of the peripheral surface of the sleeve 227.

The lower end of the sleeve 227 extends a relatively short distance into the chamber 189 and is provided with a radial outwardly extending flange or head 231, which like the head 217 of the post 198, is provided with three pairs of ears 232 which extend outwardly from the head 231 and are arranged in circumferential equal spaced relation.

Each pair of ears 232 has pivotally mounted therebetween, a folding finger 233. These fingers are pivotally mounted upon a pin 234 secured to the respective ears 232, and each finger extends some distance below the head 231, and has the lower portion thereof extended laterally at both sides to form a broad contact surface 235 which is curved inwardly at the lower end thereof, and has the central portion slightly concaved to conform to the contour of the rim of the mouth of the bottle. (See Figs. 31 and 32.)

The lower ends or contacting surfaces of each of the fingers 233 are normally maintained in their outermost position by a pair of spring-pressed plungers 236 positioned one at either side of the respective fingers below the pivot 234, and have their outer ends engaging the adjacent portion of the respective pair of ears 232. (See Figure 33.)

At the upper outer edge of each of the fingers is provided an upwardly extending substantially semi-circular boss or contact member 237, which is adapted to engage the under surface of a respective shouldered bearing block or pin 238 secured in the upper wall of the chamber 189, and which determines the normal outer position of the lower folding surface 235 of each finger 233 when the sleeve 227 is in the lowermost position, (see Figure 26) and when the sleeve 227 is moved upwardly against the action of the spring 228 rocks the fingers 233 about their pivots 234 to move the contacting surfaces 235 of each of the fingers inwardly for folding the adjacent portion of the skirt of the cap blank as z under the rim of the mouth of the bottle. (See Figure 31.)

Slidably mounted upon the plait-forming plate 173 is a plurality, in this instance three, plait-folding slide members 239 arranged in equal circumferentially spaced relation and adapted to move inwardly into the chamber 189 of the head 136 through respective radial slots 240 provided in the vertical wall of the chamber 189. These slide members 239 are arranged in alignment with a respective folding finger 233 to move inwardly beneath said fingers for pressing the lower edge of the portion z of the cap blank against the neck of the bottle, and for this purpose, have the inner ends 241 thereof extended laterally in opposite directions to form a relatively broad contact surface, and having the inner vertical edge thereof slightly concaved to conform to the contour of the neck of the bottle.

Each of these plait-holding slide members 239 is yieldingly moved inwardly by the action of an expansion spring 242 positioned in a slot or groove 243 provided in the lower face of each of the folding slides, and which extend inwardly from the outer end thereof. Each of the springs 242 is maintained in said slots by the adjacent portion of the plait-forming plate 273 and is maintained between the inner end of the respective slot and a block 244 secured by a screw 245 to the plate 273 and adapted to be engaged in the outer end of the slot 243.

Each of the plait-folding slides 239 is maintained in its outermost inoperative position by means of a respective lever 246 against the action of the spring 242, said levers being disposed in a substantially vertical plane over a respective folding slide with the lower ends thereof positioned in a transverse slot 247 provided in the upper surface of each of the folding slides near the outer end thereof, while the upper ends of the levers are positioned between respective pairs of spaced lugs 248 formed in the periphery of the lever-supporting ring 137 and pivotally connected thereto by a pin 249.

The levers 246 are also positioned in and extend through elongated slots 250 provided in substantially radially disposed horizontal arms 251 secured at their inner ends in uniformly spaced relation circumferentially to a sleeve member 252 which is slidably mounted for vertical reciprocating movement upon the post 200 connected with the head 136.

The levers 246 are maintained in their normal vertical or outermost positions by respective rollers 253 positioned in the slots 250 near the inner ends thereof, and which are rotatably mounted upon respective pins 254 secured at their ends in the arms 251 at opposite sides of the slots 250.

The rollers 253 are positioned so as to be in contact with the inner vertical edge of the respective levers 246.

The upper portion of the inner vertical edge or wall of each of the levers 246 terminates in a cam portion 246' which is inclined outwardly and upwardly and positioned below the ring member 137 so that when the sleeve 252 is moved to the extreme up position, as indicated in Figure 31, the rollers 253 will be positioned above the cam surface 246' out of contact with the respective levers 246, and which permits the levers to be rocked inwardly about their respective pivots 249 by the action of the springs 242 upon their respective slides 239.

The folding slides 239 remain in the innermost or plait-folding position until after said plaits are secured together, and to the intervening portions of the skirt by stapling or other suitable means, after which the slides are simultaneously returned to the normal outermost position against the action of the respective springs 242 by the outward pivotal movement of the levers 246 caused by the downward movement of the sleeve 252 which first brings the rollers 253 into contact with the respective cam surfaces 246', which quickly rocks the levers outwardly and then maintains said levers in their outward positions during the remainder of the downward stroke of the levers by the rollers contacting with substantially vertical portions of the inner edges of said levers.

The reciprocating movement of the sleeve 252 is produced by the hereinbefore mentioned bell crank lever 214 which has the forward end thereof positioned between a pair of link members 255 to which the lever is pivotally connected by means of pins 256.

The links 255 extend downwardly from the pivots 256 and are pivotally connected by shoulder studs 257 to the sleeve 252.

The bell crank lever 214 is mounted between a pair of upwardly extending ears 258 formed integrally with the upper end of the hub, and to which the lever is pivotally connected by means of a pin 259.

The rearwardly positioned arm as 214' of the bell crank lever 214 extends downwardly and rearwardly from the pivot 259, and has a stud 260 secured to the lower end thereof. Rotatably mounted on the stud 260 at one side of the arm 214' is a substantially rectangular guide block 261 which is slidably mounted in a vertically disposed groove 262 formed in one face of a cross head 263 which is slidably mounted for longitudinal reciprocative movement in a horizontal plane in a suitable guide bracket 264 secured to the upper surface of the bed plate 2 at the rear of the supporting posts 123 and substantially diametrically opposite the capping head 136.

The groove 262 is positioned at the forward end of the cross head 263 and is of sufficient length to maintain the guide block 261 in operative engagement therewith during any vertical movement of the supporting post 123, and the bell crank lever 214 carried therewith necessary for the proper positioning of the head 136 for capping bottles of different heights.

The cross head 263 may be reciprocated in any suitable manner for rocking the bell crank lever 214 and for this purpose, a rock arm 265 pivoted intermediate its ends upon the hereinbefore mentioned stud 153 has the rear end thereof provided with a roller stud 266 which is adapted to travel in a cam groove 267 provided in the upper face of the cam member 151. (See Figures 1 and 3.)

The opposite or forward end of the rock arm 265 is positioned in a horizontal slot 268 provided in the cross head 263 at the rear of the guide slot 262, the forward end of the arm 265 being mounted between opposed ends of a pair of plungers 270 and 271 slidably mounted in a bore 263' extending longitudinally through the center of the cross head 263.

One of the plungers as 270 is yieldingly maintained in contact with the arm 265 by a spring 272 while the other plunger 271 is adjusted to and from the plunger 270 by means of adjusting screw 273 screw-threaded in the outer end of the bore 263', and which may be secured in the adjusted position by a lock nut 274 for maintaining the cross head 263 in the proper relation with the rock arm 265 for obtaining the desired movement of the bell crank lever 214.

It is evident that this construction not only provides a yielding operative connection between the arm 265 and the cross head 263 for moving the cross head in one direction which is to cause the upward movement of the forward arm of the bell crank lever 214 and a consequent lifting of the lever-actuating sleeve 252, but also provides a means whereby the cross head may be adjusted relatively to the operating arm 265 by manipulation of the adjusting screw 273 for varying the position of the forward end of the bell crank lever 214 vertically, and consequently, a corresponding adjustment of the sleeve 252 for the purpose of positioning the lever-actuating rollers 253 carried by the sleeve into proper relation to the cam faces 246' of the levers 246, when said sleeve is in the uppermost position as hereinbefore explained.

It may now be understood that during each revolution of the cam shaft 10, and therefore, of the cam 151, the cross head 263 will have a corresponding longitudinal movement produced by the action of the rock arm 265. This movement of the cross head will produce a corresponding rocking movement of the bell crank lever 214 which, in turn, produces first an upward movement of the sleeve 252 to release the levers 246 and permit the folding slides 239 to be moved inwardly by the action of the respective springs 242 to produce the folding of the lower portions of the skirt of the cap and maintain said portions in contact with the neck of the bottle for a relatively short period due to the particular shape of the cam groove 267 for the purpose of permitting the folded plaits of the cap to be secured together in any suitable manner, after which the folding slides 239 will be returned to the normal inoperative position by the downward movement of the sleeve in the manner previously described.

Cap-securing means

As hereinbefore indicated, the skirt of the cap may be secured in any suitable manner in the folded position about the neck of the bottle, and for this purpose, there is indicated in the drawings, and more particularly, in Figures 26, 31, and 32, a plurality of, in this instance three, suitable stapling mechanisms designated by the numeral 280.

These mechanisms are arranged in uniform circumferentially spaced relation intermediate the folding fingers 233, and therefore, in the vertical plane of the fingers 219.

Each of these stapling mechanisms 280 is operably mounted on the plait-folding plate 173 in respective radially disposed recesses 281 provided in the capping head 136, and may be actuated as shown, by a respective vertically disposed rock arm 282 which extends upwardly from the stapling mechanism 280, and has its upper end pivotally mounted at 283 to the lever-supporting ring 137.

The lower ends of these rock arms 282 extend through an elongated slot 284 provided in the upper wall of the capping head 136, and are provided with a segmental gear 285 adapted to have meshing engagement with rack teeth 286 provided in the upper surface of the stapling mechanism 280.

Each of the rock arms 282 may be rocked about their respective pivots 283 for actuating the stapling mechanisms 280 after the cap blank has been folded about the mouth and around the neck of the bottle by the fingers 219 and 233, and the folding slides 239 during the upward movement of the sleeve 252, and for this purpose, each of the rock arms 282 is operably connected with said sleeve by means of a respective connecting link 287 pivotally connected at one end to the sleeve 252 by means of a pin 288, and the other end to the respective rock arm 282 by means of a pin 289, as illustrated in Figures 26 and 31.

The mechanism of the stapling apparatus 280 may be of any desired construction for obtaining the desired result, and as this does not enter into the present invention, it will therefore not be further described.

Operation

Assuming that the motor 4 is in operation and that the conveyer A is moving from right to left, as indicated by the arrow x in Figure 1, and that the remainder of the mechanism is at rest due to the clutch 11 being maintained in the disconnected position by latch release lever 27, the cam shaft 10 and the cam secured thereto will be in the position illustrated in Figure 4, and at substantially 130 degrees rearwardly in the direction of rotation from the position shown in Figures 1, 2, 3, 5, 6, 7, 12, and 26, which will locate the lever operating sleeve 252 intermediate its upper and lower positions on the downward stroke and the cap folding mechanism comprising the fingers 219 and 233, the platen 195 and the folding slides 239 will be in their normal inoperative positions as illustrated in Figure 26.

The cap feeding plate 135 will be in its outermost position with the disk receiving recess 145 beneath the magazine 141 in registration therewith for receiving the lowermost cap blank from said magazine.

The bottle lifting plunger 110 will be in its lowermost position with the upper end thereof in the plane of the upper surface of the bed plate 2, and the bottle carrier 60 will have a bottle-receiving recess 59 in registration with the receiving ends of the bottle guides 105 and 106 in position to receive a bottle being carried forward by the conveyer a, as illustrated in the drawings, and the operating arm 98 will be positioned to engage the star wheel 97 at substantially 130 degrees rearwardly in the direction of motion from the position shown in Figure 6 for actuating the bottle carrier 60 during the initial movement of the cam shaft 10 upon the clutch 11 being engaged.

Assuming that a series of bottles of given sizes, as pint bottles, ready to be capped, appear upon the conveyer a, as the foremost bottle approaches the bottle guides 105 and 106, it will be directed into the registering bottle-receiving recess 59 and into contact with the roller 58 on the rock arm 57, which will cause the latch 51 to release the rock arm 46 and permit the spring 40 to actuate the latch release lever 27, and thereby permit the engaging of the clutch 11. This will cause the cam shaft 10 to be rotated by the motor 4, and the consequential operation of the remaining portion of the mechanism, that is the bottle carrier 60, will be actuated to move the bottle as B over the bed plate 2 and position said bottle upon the plunger 110, and at the same time, the lowermost cap blank D will be carried by the feed plate 135 from the magazine 141 to a position between the head of the bottle B and the platen 195.

As the bottle comes to rest upon the plunger 110, the cam 116 will actuate the arm 112 to move said plunger and the bottle thereon in an upward direction, and as the rim $b$ of the mouth of the bottle passes through the bottle-receiving opening 166 in the forward end of the feed plate 135, said rim will engage the positioning blocks 167 and 170, and thus be brought into co-axial relation with the disk blank carried by the plate 135, and with the cap forming and applying mechanism in the manner hereinbefore described.

As the plunger 110 and the bottle continued the upward vertical movement, the rim of the bottle will engage the cap blank and raise said blank from the recess 145, and bring it into contact with the platen 195. The link-actuating sleeve 252 will then be in substantially its lowermost position as the cam shaft 10 continues to rotate, the feed plate 135 will begin its rearward movement away from the mouth of the bottle, and as the bottle continues its upward movement, the central portion of the blank will be impinged between the top of the bottle and the platen 195, in which position, the platen and cap blank will be forced upwardly through the opening 188 in the plait-forming plate 173 against the action of the spring 201, and thereby plaiting the skirt of the cap blank, as illustrated in Figure 36, and at the same time, bringing registering portion $x$ of the blank into engagement with the lower positioned folding fingers 219, which will maintain said portions in their folded position and securely press and maintain the rim of the central portion of the blank in contact with the rim $b$ of the mouth of the bottle, and as the bottle continues its upward movement, it will move the post 198 and platen 195 upwardly therewith against the action of the spring 215, the tension of which will remain substantially uniform due to the then upward movement of the forward end of the rock arm 214, which will permit the corresponding upward movement of the sleeve 209.

This continued upward movement of the bottle will bring the skirt portions $z$ of the cap blank into engagement with the respective fingers 233 which will maintain said portions in their folded positions, and as the head 217 of the post 198 comes in contact with the head 231, of the sleeve 227, said post and sleeve will move upwardly in unison and thereby cause the inward rocking movement of the lower ends 235 of each of the fingers 233 as the contacting portions 237 thereof are maintained against upward movement by the contact members 238, and thereby cause the adjacent portion of the cap skirt to be firmly wrapped about the under side of the rim $b$ of the mouth of the bottle, as indicated in Figure 31.

Upon the bottle and plunger coming to rest in the uppermost position, the link-actuating sleeve 252 will be approaching its uppermost position with the roller 253 registering with the cam portions of the respective levers 246 so that the plait-folding slides 239 may be moved inwardly by the action of the respective springs 242 for folding the plait-portions $y$ of the blank inwardly towards each other—that is, upon the adjacent portion of the rectangular portions $x$ of the blank, and at the same time, cause the intermediate portions $z$ of the skirt of the cap to be firmly pressed against the neck of the bottle. By this time, securing means such as the stapling mechanism indicated at 280 may be actuated by the rock arms 282 by the action of the sleeve 252 as it approaches its uppermost position through the medium of the links 287 and as the forward end of the stapling mechanism, such as the staple guide plates 290 approaches the neck of the bottle, the adjacent lower edges of the plaits $y$ will be firmly pressed against the neck of the bottle as illustrated more particularly in Figure 32, so that as the plaits are secured together and to the adjacent portion of the cap skirt, that is the portion $x$, the skirt of the cap will be firmly maintained substantially throughout the entire surface thereof in contact with the bottle, and thus insure the securing of the cap to the bottle in a very close and impervious manner.

The sleeve 252 now begins its return or downward stroke which moves the stapling mechanism, and the plait-folding slides 239 outwardly away from the neck of the bottle, after which the plunger 110 and capped bottle together with the remainder of the mechanism are returned to their starting positions, which positions the bottom of the bottle flush with the top surface of the bed plate 2 so that as the next succeeding bottle enters the bottle-receiving recess 59 registering with the conveyer A and trips latch release lever 27 to engage the clutch members so that the cam shaft 10 will be rotated by the motor 4 to begin another bottle capping operation, the capped bottle will be carried away from the plunger 110 as the succeeding bottle is moved from the conveyer on to the plunger by the intermittent rotary action of the carrier 60.

Although there is shown and particularly described a preferred embodiment of this invention, it is evident that various changes both in the details of the construction and the form and the relation of the parts thereof, may readily be made without departing from the spirit of this invention as set forth in the appended claims.

I claim:

1. In a bottle-capping machine in combination with a cap-forming and applying mechanism, of a shaft journaled adjacent said mechanism, a carrier having spaced bottle-receiving recesses and adapted to be reversibly secured to the shaft to rotate therewith for moving bottles in either direction into and out of operative relation with said cap-forming and applying mechanism, actuating means for intermittently rotating the shaft including a clutch normally maintained out of engagement, and reversible means adapted to be actuated by the bottles as they enter said recesses for automatically engaging said clutch.

2. In a bottle-capping machine, a cap-forming and plaiting die adapted to receive the head of a bottle therethrough, means for producing relative movement of a bottle and said cap-forming die to plait the skirt of the cap about the head of said bottle, resilient means for maintaining the skirt of the cap in contact with the periphery of the rim of the mouth of the bottle, and separate resilient means for tightly folding said plaits about the neck of the bottle.

3. A cap-forming and plaiting die having an opening therethrough adapted to receive the head of a bottle, means for producing relative movement of a bottle with a cap blank positioned over the head thereof and said die for plaiting the skirt of said cap, means engaging the head of the bottle to maintain the cap thereon during said relative movement, and resilient means mounted adjacent said die and actuated by said relative movement of the bottle and die for automatically folding the plaits about the neck of the bottle.

4. A cap-forming and plaiting die having an opening therethrough adapted to receive the head of a bottle, means for producing relative movement of a bottle with a cap blank positioned over the head thereof and said die for plaiting the skirt of said cap, a platen engaging the head of the bottle to maintain the cap thereon during said relative movement, resilient means for maintaining the skirt of the cap in contact with the periphery of the rim of the mouth of the bottle, and additional means for folding said plaits about the neck of the botle.

5. A cap-forming and plaiting die having an opening therethrough adapted to receive the head of a bottle, means for producing relative movement of a bottle with a cap blank positioned over the head thereof and said die for plaiting the skirt of said cap, a platen engaging the head of the bottle to maintain the cap thereon during said relative movement, resilient means for maintaining the skirt of the cap in contact with the periphery of the rim of the mouth of the bottle, pivoted folding means adapted to fold the skirt of the cap, and means for producing pivotal movement of said folding means for tightly wrapping said folds about the neck of the bottle.

6. A cap-forming and plaiting die having an opening therethrough adapted to receive the head of a bottle, means for producing relative movement of a bottle with a cap blank positioned over the head thereof and said die for plaiting the skirt of said cap, a platen engaging the head of the bottle to maintain the cap thereon during said relative movement, resilient means for maintaining the skirt of the cap in contact with the periphery of the rim of the mouth of the bottle, pivoted folding means adapted to fold the skirt of the cap, means for producing pivotal movement of said folding means for tightly wrapping said folds about the neck of the bottle, and additional means for pressing the edges of the plaits against the bottle.

7. A cap-forming and plaiting die having an opening therethrough adapted to receive the head of a bottle, means for producing relative movement of a bottle with a cap blank positioned over the head thereof and said die for plaiting the skirt of said cap, a platen engaging the head of the bottle to maintain the cap thereon during said relative movement, resilient means for maintaining the skirt of the cap in contact with the periphery of the rim of the mouth of the bottle, pivoted folding means adapted to fold the skirt of the cap, means for producing pivotal movement of said folding means for tightly wrapping said folds about the neck of the bottle, additional means for pressing the edges of the plaits against the bottle, and means for securing said skirt in the wrapped position.

8. In a bottle capping machine in which the cap blanks are of sufficient area to skirt the head and neck of the bottle when applied thereto, a die element having an opening therethrough formed with a plurality of spaced surfaces conforming substantially to the contour of the head of the bottle, and substantially flat surfaces intermediate the first mentioned surfaces, said surfaces being adapted to permit the free passage of the head of the bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation.

9. In a bottle capping machine in which the cap blanks are of sufficient area to skirt the head and neck of the bottle when applied thereto, a die element having an opening therethrough formed with a plurality of spaced surfaces conforming substantially to the contour of the head of the bottle, and substantially flat surfaces intermediate the first mentioned surfaces, said surfaces being adapted to permit the free passage of the head of the bottle therebetween with certain of said surfaces having greater length than the remaining surfaces, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation.

10. In a bottle capping machine in which the cap blanks are of sufficient area to skirt the head and neck of the bottle when applied thereto, a die element having an opening therethrough formed with a plurality of arcuate spaced surfaces, and substantially flat surfaces positioned intermediate the first mentioned surfaces, said surfaces being adapted to permit the free passage of the head of a bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation.

11. In a bottle capping machine in which the cap blanks are of sufficient area to skirt the head and neck of the bottle when applied thereto, a die element having an opening therethrough formed with a plurality of arcuate spaced surfaces, and substantially flat surfaces of greater length than said arcuate surfaces positioned intermediate the first mentioned surfaces, said surfaces being adapted to permit the free passage of the head of a bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation.

12. In a bottle capping machine in which the cap blanks are of sufficient area to skirt the head and neck of the bottle when applied thereto, a die element having an opening therethrough formed with a plurality of spaced surfaces conforming substantially to the contour of the head of the bottle and substantially flat surfaces intermediate the first mentioned surfaces, said surfaces being adapted to permit the free passage of the head of the bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation, and means alined with said surfaces for folding said skirt about the neck of the bottle.

13. In a bottle capping machine in which the cap blanks are of sufficient area to skirt the head and neck of the bottle when applied thereto, a die element having an opening therethrough formed with a plurality of spaced surfaces conforming substantially to the contour of the head of the bottle, and substantially flat surfaces intermediate the first mentioned surfaces, said surfaces being adapted to permit the free passage of the head of the bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation, and yielding means alined with said surfaces for folding said skirt about the neck of the bottle.

14. In a bottle capping machine in which the cap blanks are of sufficient area to skirt the head and neck of the bottle when applied thereto, a die element having an opening therethrough formed with a plurality of spaced surfaces conforming substantially to the contour of the head of the bottle, and substantially flat surfaces intermediate the first mentioned surfaces, said surfaces being adapted to permit the free passage of the head of the bottle therebetween, a bottle supporting element for holding the head of the bottle in alinement with the opening in the die, means for placing a cap blank between the head of the bottle and said die, means for effecting relative endwise movement of said elements toward each other to cause the head of the bottle and cap blank to enter the opening and thereby to form and plait the cap skirt in one operation, and yielding means alined with said surfaces and actuated by the relative movement of the bottle and the die element for folding said skirt about the neck of the bottle.

15. In a bottle capping machine in which the cap blanks are formed with flattened sides and of sufficient area to skirt the head and neck of the bottle when applied thereto, a die element having an opening therethrough formed with a plurality of arcuate spaced surfaces and substantially flat surfaces positioned intermediate the first mentioned surfaces, said surfaces being adapted to permit the free passage of the head of the bottle therebetween, a bottle supporting element for holding the head of the bottle in alinement with the opening in the die, means for placing a cap blank between the head of the bottle and said die with the flattened sides of the blank in predetermined relation with said surfaces of the die element, means for effecting relative endwise movement of said elements towards each other to cause the head of the bottle and cap blank to enter the opening and thereby to form and plait the cap skirt in one operation.

16. In a bottle capping machine, a cap forming die adapted to form the central portion of a cap blank over the head of a bottle and to fold the remaining portion of the blank about the neck of the bottle, a bottle supporting element for holding a bottle beneath said die, feeding means adapted to position a cap blank between the head of the bottle and said die, and means actuated by said feeding means adapted to position the head of the bottle in coaxial alinement with the cap blank.

17. In a device of the class described in combination, cap plaiting means, means producing relative movement of the bottle with the cap blank positioned over the head thereof and said first-mentioned means for plaiting the skirt of said cap, and resilient means engaging the cap blank during said relative movement and actuated thereby for folding the plaited portion of the skirt around the neck of the bottle.

18. In a device of the class described in combination, cap plaiting means, means producing relative movement of the bottle with the cap blank positioned over the head thereof and said first-mentioned means for plaiting the skirt of said cap, resilient folding elements pivotally mounted adjacent said plaiting means in position to be engaged by the cap blank during said relative movement and to be rocked thereby for effecting the folding of the plaited portion of the skirt around the neck of the bottle.

19. In a device of the class described in combination, cap plaiting means, means producing relative movement of the bottle with the cap blank positioned over the head thereof and said first-mentioned means for plaiting the skirt of said cap, folding elements pivotally mounted adjacent said plaiting means, spring means for yieldingly maintaining said elements in position to be engaged by the cap blank during said relative movement and to be rocked thereby for effecting the folding of the plaited portion of the skirt around the neck of the bottle, and additional spring means for causing said elements to yieldingly engage the cap blank.

20. In a device of the class described in combination, cap plaiting means, means producing relative movement of the bottle with the cap blank positioned over the head thereof and said first-mentioned means for plaiting the skirt of said cap, and a plurality of sets of folding elements movably mounted in longitudinal spaced relation to be engaged by the cap blank during said relative movement and to be actuated thereby to respectively maintain the cap blank in contact with the rim of the mouth of the bottle and to fold the plaited portion of the skirt beneath said rim.

21. In a device of the class described in combination, cap plaiting means, means producing relative movement of the bottle with the cap blank positioned over the head thereof and said first-mentioned means for plaiting the skirt of said cap, a plurality of sets of folding elements movably mounted in longitudinal spaced relation to be engaged by the cap blank during said relative movement and to be actuated thereby to respectively maintain the cap blank in contact with the rim of the mouth of the bottle and to fold the plaited portion of the skirt beneath said rim, and means for yieldingly maintaining each set of elements in position to engage the cap blank.

22. In a device of the class described in combination, cap plaiting means, means producing relative movement of the bottle with the cap blank positioned over the head thereof and said first-mentioned means for plaiting the skirt of said cap, a plurality of sets of folding elements movably mounted in position to be engaged by the cap blank during said relative movement and to be actuated thereby to respectively maintain the cap blank in contact with the rim of the mouth of the bottle and to fold the plaited portion of the skirt beneath said rim, and additional means for folding the skirt around the neck of the bottle.

23. In a device of the class described in combination, cap plaiting means, means producing relative movement of the bottle with the cap blank positioned over the head thereof and said first-mentioned means for plaiting the skirt of said cap, a pair of reciprocating supporting means mounted adjacent one side of the plaiting means in the path of movement of said bottle and cap blank to be actuated thereby during said relative movement, a set of folding elements pivotally mounted on each supporting means, one of said set of elements being adapted to yieldingly maintain the cap blank in contact with the rim of the mouth of the bottle, and means for effecting the rocking of the other set of elements toward said bottle during said relative movement to fold the plaited portion of the skirt beneath said rim.

24. In a bottle-capping machine in which the cap blanks are of sufficient area to skirt the head and neck of the bottle when applied thereto, a cap-forming and applying mechanism adapted to receive the head of the bottle therein and comprising a holding element for maintaining the central portion of the cap blank upon the head of the bottle, forming and folding means for engaging spaced portions of the skirt of the cap blank for bending said portions downwardly over the rim and about the neck of the bottle, separate forming and folding means for engaging portions of the skirt intermediate said spaced portions for bending said latter portions downwardly over the rim and about the neck of the bottle in overlying relation with said first-mentioned portions of the skirt, and means for producing relative movement of the bottle with the cap blank positioned thereon and said cap-forming and applying mechanism toward each other.

25. A device as set forth in claim 24 comprising means for securing the overlying portions of the skirt together.

26. In a bottle-capping machine in which the cap blanks are of sufficient area to skirt the head and neck of the bottle when applied thereto, a cap-forming and applying mechanism adapted to receive the head of the bottle therein and comprising a holding element for maintaining the central portion of the cap blank upon the head of the bottle, forming means arranged in fixed spaced relation for positively bending portions of the skirt of the cap blank downwardly over the rim of the mouth of the bottle, resilient folding means for folding spaced portions of the bent skirt about the neck of the bottle, separate resilient folding means for folding portions of the skirt intermediate said spaced portions about the neck of the bottle and in overlying relation with said spaced portions of the skirt, and means for producing relative movement of the bottle with the cap blank positioned thereon and said cap-forming and applying mechanism toward each other.

27. In a device of the class described in combination, a cap-folding means and means for producing relative movement of said folding means and a bottle having a cap blank provided with a plaited skirt portion positioned over the head thereof towards each other, said folding means comprising means for maintaining the central portion of the cap blank over the head of the bottle, and a plurality of resilient folding elements movable toward and from the bottle, and means actuated by said relative movement of the bottle and cap-folding means for effecting the movement of the elements.

28. In a device of the class described in combination, a cap-folding means and means for producing relative movement of said folding means and a bottle having a cap blank provided with a plaited skirt portion positioned over the head thereof toward each other, said folding means comprising means for maintaining the central portion of the cap blank over the head of the bottle, a resilient folding element movable radially toward and from said bottle, and means effecting the movement of said element.

29. In a device of the class described in combination, a cap-folding means and means for producing relative movement of said folding means and a bottle having a cap blank provided with a plaited skirt portion positioned over the head thereof toward each other, said folding means comprising means for maintaining the central portion of the cap blank over the head of the bottle, a resilient folding element movable radially toward and from said bottle, and means actuated by said relative movement of the bottle and cap-folding means for effecting the movement of the element.

30. In a device of the class described in combination, a cap-folding means and means for producing relative movement of said folding means and a bottle having a cap blank provided with a plaited skirt portion positioned over the head thereof toward each other, said folding means comprising means for maintaining the central portion of the cap blank over the head of the bottle, a folding element movable radially toward and from said bottle, and means for yieldingly effecting the movement of said element.

31. In a device of the class described in combination with a continuously moving bottle conveyor, of a support adapted to be positioned adjacent one side of said conveyor in co-operative relation therewith for receiving bottles therefrom, a cap-applying mechanism mounted on the support, bottle-actuating means mounted on the support in a plane intermediate the cap-applying mechanism and the conveyor, a bottle guide mechanism connected with the support and arranged at the opposite side of the conveyor to co-operate with the actuating means for guiding bottles in their movement to and from the conveyor, means for intermittently operating the actuating means for successively moving bottles from the conveyor into operative relation with the cap-applying mechanism and to return the capped bottles to said conveyor, and bottle-actuated means associated with the latter operating means and positioned adjacent said conveyor for controlling the operation of the actuating means.

32. A bottle-capping machine comprising in combination mechanism for applying the central portion of a cap blank to the mouth of a bottle, means for producing a relative movement of the bottle and said mechanism toward each other to bring the head of the bottle with the cap blank thereon into operative engagement therewith, resilient movable elements responsive to said relative movement of the bottle and mechanism for contracting the marginal portion or skirt of the blank about the neck of the bottle, additional resiliently actuated means for pressing excess portions of the skirt into overlapping relation, and means for securing the overlapping portions together.

33. A bottle-capping machine comprising in combination a bottle-supporting element, a cap-forming element adapted to receive the mouth of the bottle with the cap blank thereon, means for effecting a relative movement of said elements toward each other to cause the head of the bottle with the cap blank thereon to enter the forming element to form the skirt of the cap, additional means responsive to the relative movement of the bottle and one of the elements for wrapping portions of the skirt into overlapping positions about the neck of the bottle, and means for stapling overlapping portions of the skirt to each other.

34. A bottle-capping machine comprising in combination a bottle-supporting element, a cap-forming element adapted to receive the mouth of the bottle with the cap blank thereon, means for effecting a relative movement of said elements toward each other to cause the head of the bottle with the cap blank thereon to enter the forming element to form the skirt of the cap, spring-actuated means responsive to the relative movement of the bottle and one of the elements for wrapping portions of the skirt into overlapping positions about the neck of the bottle, and means for stapling overlapping portions of the skirt to each other.

35. A bottle-capping machine comprising in combination a bottle-supporting element, a cap-forming element adapted to receive the mouth of the bottle with the cap blank thereon, means for effecting a relative movement of said elements toward each other to cause the head of the bottle with the cap blank thereon to enter the forming element to form the skirt of the cap, a plurality of spring-actuated members pivotally mounted for movement toward and from the path of movement of the bottle and responsive to the relative movement of the bottle and one of the elements for wrapping portions of the skirt into overlapping positions about the neck of the bottle, and means for stapling overlapping portions of the skirt to each other.

36. In a machine for applying a cover-all cap to a bottle having a mouth and an outwardly extending shoulder contiguous said mouth, mechanism for applying the central portion of a cap blank to the mouth of the bottle and for bending the marginal portion of the blank downwardly over the shoulder to form a skirt, circumferentially spaced elements for contracting corresponding portions of the skirt beneath said shoulder, additional elements for contracting the remaining portions of said skirt beneath said shoulder in overlapping relation with the first-mentioned skirt portions, and means for stapling overlapping portions of the skirt to each other.

37. In a machine for applying a cover-all cap to a bottle having a mouth and an outwardly extending shoulder contiguous said mouth, mechanism for applying the central portion of a cap blank to the mouth of the bottle and for bending the marginal portion of the blank downwardly over the shoulder to form a skirt, circumferentially spaced elements for contracting corresponding portions of the skirt beneath the shoulder, additional elements for contracting the remaining portions of said skirt beneath said shoulder in overlapping relation with the first-mentioned skirt portions, means for yieldingly actuating said elements, and means for stapling overlapping portions of the skirt together.

38. In a machine for applying a cover-all cap to a bottle having a mouth and an outwardly extending shoulder contiguous said mouth, mechanism for applying the central portion of a cap blank to the mouth of the bottle, a plurality of spaced resilient means for contracting corresponding portions of the marginal portion of the blank beneath the shoulder of the bottle, additional resilient means for contracting the remaining marginal portions of said blank beneath said shoulder in overlapping relation with the first-mentioned marginal portions, and means for securing overlapping portions of the blank together.

39. In a machine for applying a cover-all cap to a bottle having a mouth and an outwardly extending shoulder contiguous said mouth, mechanism for applying the central portion of a cap blank to the mouth of the bottle, a plurality of spaced resilient means for contracting corresponding portions of the marginal portion of the blank beneath the shoulder of the bottle, additional resilient means for contracting the remaining marginal portions of said blank beneath said shoulder in overlapping relation with the first-mentioned marginal portions, and stapling means for securing overlapping portions of the blank together.

40. In a device of the class described in combination, a cap-folding means, and means for producing relative movement of said folding means and a bottle having a cap blank scored to form a central portion and individual skirt portions positioned over the head thereof toward each other, said folding means comprising means for maintaining the central portion of the cap blank over the head of the bottle, forming means arranged in fixed spaced relation for positively bending certain of the individual skirt portions of the cap blank along score lines downwardly over the rim of the mouth of the bottle, resilient folding means for folding spaced individual portions of the skirt along score lines about the neck of the bottle, and separate individual folding means for folding intermediate individual portions of the skirt about the neck of the bottle in overlying relation with said spaced individual portions of the skirt.

41. In a device of the class described in combination, a cap-folding means, and means for producing relative movement of said folding means and a bottle having a cap blank scored to form a central portion and individual skirt portions positioned over the head thereof toward each other, said folding means comprising means for maintaining the central portion of the cap blank over the head of the bottle, and a plurality of resilient folding elements movable toward and from the bottle for folding individual skirt portions of the cap blank along score lines and pressing the same about the neck of the bottle, and means actuated by said relative movement of the bottle and cap-folding means for effecting the movement of the elements.

42. In a device of the class described in combination, a cap-folding means, and means for producing relative movement of said folding means and a bottle having a cap blank scored to form a central portion and individual skirt portions positioned over the head thereof toward each other, said folding means comprising means for maintaining the central portion of the cap blank over the head of the bottle, resilient folding elements movable radially toward and from said bottle for folding the individual skirt portions of the cap blank along said score lines and pressing the same about the neck of the bottle, and means effecting the movement of said element.

43. In a bottle capping machine adapted to apply cap blanks that are scored to form a central portion adapted to extend over the head of a bottle and a plurality of sets of spaced, individual skirt portions adapted to surround the neck of the bottle when applied thereto, cap folding means comprising means for maintaining the central portion of the cap blank over the head of the bottle, means for folding a set of spaced individual portions of the skirt along score lines about the neck of the bottle, means for folding a second set of spaced individual portions of the skirt along score lines about the neck of the bottle, means for pressing adjacent portions of the first and second sets in overlying relation with each other with the portions of the skirt intermediate said sets of spaced portions in sandwiched relation therewith, and means for bringing the bottle with a cap blank thereon and the cap folding means into cooperative relation with each other.

44. In a bottle capping machine adapted to apply cap blanks that are scored to form a central portion adapted to extend over the head of a bottle and a plurality of sets of spaced, individual skirt portions adapted to surround the neck of the bottle when applied thereto, cap folding means comprising means for maintaining the central portion of the cap blank over the head of the bottle, means for folding a set of spaced individual portions of the skirt along score lines about the neck of the bottle, means for folding a second set of spaced individual portions of the skirt along score lines about the neck of the bottle, means for pressing adjacent portions of the first and second sets in overlying relation with each other with the portions of the skirt intermediate said sets of spaced portions in sandwiched relation therewith, means for bringing the bottle with a cap blank thereon and the cap folding means into cooperative relation with each other, and means for driving staples through the adjacent corners of the overlying skirt portions.

45. In a bottle capping machine adapted to apply cap blanks that are scored to form a central portion adapted to extend over the head of a bottle and three sets of individual skirt portions arranged with the portions of said sets in alternate relation with each other and adapted to surround the neck of the bottle when applied thereto, cap folding means comprising means for maintaining the central portion of the cap blank over the head of the bottle, and separate sets of folding elements engaging said sets of individual skirt portions to fold the same along said score lines, whereby the skirt portions of one set are folded about the neck of the bottle and the skirt portions of a second set are folded about the neck of the bottle in overlying relation with the portions of the first set and with the portions of the third set in sandwiched relation with the adjacent portions of said first and second sets, and means for bringing a bottle with the cap blank thereon and the cap folding means into cooperative relation with each other.

46. In a bottle capping machine adapted to apply cap blanks that are scored to form a central portion adapted to extend over the head of a bottle and three sets of individual skirt portions arranged with the portions of said sets in alternate relation with each other and adapted to surround the neck of the bottle when applied thereto, cap folding means comprising means for maintaining the central portion of the cap blank over the head of the bottle, and separate sets of folding elements engaging said sets of individual skirt portions to fold the same along said score lines, whereby the skirt portions of one set are folded about the neck of the bottle and the skirt portions of a second set are folded about the neck of the bottle in overlying relation with the portions of the first set and with the portions of the third set in sandwiched relation with the adjacent portions of said first and second sets, means for bringing a bottle with the cap blank thereon and the cap folding means into cooperative relation with each other, and means for driving staples through the adjacent corners of said overlying second set of skirt portions.

47. In a bottle capping machine in combination, a cap folding means and means for producing relative movement of said folding means and a bottle having a cap blank scored to form a central portion and a plurality of sets of spaced individual skirt portions positioned over the head thereof toward each other, said folding means comprising a reciprocating platen for maintaining the central portion of the cap blank over the head of the bottle, a plurality of sets of swinging folding elements, one for each set of spaced individual skirt portions, and spring actuated members including reciprocative sleeve means mounted co-axially with the platen, operatively connected with the sets of folding elements and actuated by said relative movement of the folding means and bottle for yieldingly folding corresponding sets of individual portions of the skirt along score lines about the neck of the bottle with one set of said individual portions of the skirt in overlying relation with another set of individual skirt portions.

48. A device as in claim 47 comprising means for securing the overlapping portions of the skirt together.

49. In a container cover applying machine, in combination, co-axial members relatively movable along their common axis, one constituting a holder, another having depending fingers, and a third having depending fingers therebetween whereby said second member fingers are adapted to fold down parts of a container cover held by the first, and said third member fingers are adapted to fold down other parts, and means for securing said parts together.

50. In a container cover applying machine, in combination, concentric sliding plungers, the first constituting means for holding a blank on top of the container, the second having depending fingers for folding down portions of said blank, and the third having depending fingers between those of the second, for folding down other portions of said blank.

51. In a container cover applying machine, in combination, a slidable plunger constituting means for holding a cover blank on top of a container, a plurality of sets of folding fingers, and means operatively supporting said fingers in concentric relation with the plunger with the fingers of each set in circumferential spaced relation with each other and with the fingers of one set arranged between and in axially spaced relation to the fingers of another set whereby each set of fingers will operatively engage portions of the blank spaced from the portions engaged by the remaining fingers for folding the same about the side of the container.

52. A device as in claim 51 wherein at least one set of fingers is provided with spring means for yieldingly urging the same toward the axis of the plunger.

53. In a container cover applying machine, in combination, a support, a plunger slidably mounted therein and constituting means for holding a cover blank on top of a container, a plurality of sets of folding fingers, and means mounted in the support and movable axially of the plunger for maintaining said fingers in concentric relation with said plunger with the fingers of each set in circumferential spaced relation with each other and with the fingers of one set arranged between the fingers of another set whereby each set of fingers will operatively engage respective spaced portions of the blank for folding the same downwardly over the side of the container.

54. In a container cover applying machine, in combination, a support, a plunger slidably mounted therein and constituting means for holding a cover blank on top of a container, a pair of sleeve members slidably mounted in the support in concentric relation with the plunger, two sets of folding fingers, one set for each sleeve, means pivotally connecting each set of fingers with its respective sleeve with the fingers of one set having the blank engaging portions thereof spaced axially of the sleeves relative to the corresponding portions of the fingers of the other set whereby the sets of fingers will engage corresponding spaced portions of the blank for bending the same axially.

55. A device as in claim 54 wherein the pivotal means of one set of fingers are arranged between the pivotal means of the other set of fingers whereby the fingers of one set will be arranged between the fingers of the other set.

56. A device as in claim 54 wherein at least one set of fingers is provided with spring means for yieldingly urging the blank engaging portions thereof inwardly toward the axis of the sleeve members.

JOSEPH FRANK MITCHELL.